US011638304B2

(12) United States Patent
Ishii

(10) Patent No.: US 11,638,304 B2
(45) Date of Patent: *Apr. 25, 2023

(54) RANDOM ACCESS PROCEDURE(S) FOR RADIO SYSTEM

(71) Applicants: SHARP KABUSHIKI KAISHA, Sakai (JP); FG Innovation Company Limited, Tuen Mun (HK)

(72) Inventor: Atsushi Ishii, Vancouver, WA (US)

(73) Assignees: SHARP KABUSHIKI KAISHA, Sakai (JP); FG Innovation Company Limited, Tuen Mun (HK)

(*) Notice: Subject to any disclaimer, the term of this patent is extended or adjusted under 35 U.S.C. 154(b) by 0 days.

This patent is subject to a terminal disclaimer.

(21) Appl. No.: 17/018,127

(22) Filed: Sep. 11, 2020

(65) Prior Publication Data

US 2020/0413452 A1 Dec. 31, 2020

Related U.S. Application Data

(63) Continuation of application No. 15/939,204, filed on Mar. 28, 2018, now Pat. No. 10,820,352.

(Continued)

(51) Int. Cl.
*H04W 74/08* (2009.01)
*H04W 48/12* (2009.01)
*H04W 72/23* (2023.01)

(52) U.S. Cl.
CPC ....... *H04W 74/0833* (2013.01); *H04W 48/12* (2013.01); *H04W 72/23* (2023.01)

(58) Field of Classification Search
CPC ............ H04W 74/0833; H04W 72/042; H04W 48/12
See application file for complete search history.

(56) References Cited

U.S. PATENT DOCUMENTS

| 10,820,352 | B2* | 10/2020 | Ishii | ............... H04W 48/12 |
| 2016/0105912 | A1* | 4/2016 | Stattin | ............... H04W 74/08 |
| | | | | 370/216 |

(Continued)

FOREIGN PATENT DOCUMENTS

| WO | 2016004994 A1 | 1/2016 |
| WO | 2016144082 A1 | 9/2016 |

OTHER PUBLICATIONS

Samsung, "On Demand SI Request Transmission Mechanism", Feb. 2017, 3GPP TSG-RAN WG2 Meeting #97, R2-1700817, pp. 1-2. (Year: 2017).*

(Continued)

*Primary Examiner* — Robert C Scheibel
(74) *Attorney, Agent, or Firm* — ScienBiziP, P.C.

(57) ABSTRACT

A method for performing a system information (SI) request is provided. The method includes initiating a random access (RA) procedure for the SI request; transmitting, to a base station (BS), an RA preamble on a physical random access channel (PRACH) resource during the RA procedure; receiving, from the BS, a Random Access Response (RAR) including a medium access control (MAC) protocol data unit (PDU) during the RA procedure, the MAC PDU including a first MAC subheader; and considering the RAR reception successful in a case that the first MAC subheader includes a random access preamble identifier (RAPID) corresponding to the RA preamble.

16 Claims, 20 Drawing Sheets

Related U.S. Application Data

(60) Provisional application No. 62/478,530, filed on Mar. 29, 2017.

(56) References Cited

U.S. PATENT DOCUMENTS

| | | | |
|---|---|---|---|
| 2017/0111932 A1* | 4/2017 | Uemura | H04L 5/0055 |
| 2018/0270866 A1* | 9/2018 | Loehr | H04L 1/188 |
| 2018/0270868 A1* | 9/2018 | Ou | H04W 72/042 |
| 2018/0279378 A1* | 9/2018 | Tsai | H04W 56/0005 |
| 2019/0335515 A1* | 10/2019 | Chen | H04W 76/18 |
| 2019/0349787 A1* | 11/2019 | Kim | H04W 48/10 |

OTHER PUBLICATIONS

Samsung, On Demand SI Delivery:Signaling Aspects,3GPP TSG-RAN WG2 NR R2-170001 1,Jan. 17-19, 2017.
Ericsson, R2-1702857, Open issues of on-demand SI, 3GPP TSG-RAN WG2 #97bis Spokane, USA, Apr. 3-7, 2017.

* cited by examiner

RANDOM ACCESS PROCEDURE(S) FOR RADIO SYSTEM

CROSS-REFERENCE TO RELATED APPLICATION(S)

This application is a continuation application of U.S. patent application Ser. No. 15/939,204, now U.S. Pat. No. 10,820,352, filed on Mar. 28, 2018, which claims the benefit of and priority to provisional U.S. Patent Application Ser. No. 62/478,530, filed on Mar. 29, 2017. The contents of all above-named applications are fully incorporated herein by reference for all purposes.

FIELD

The technology relates to wireless communications, and particularly to methods and apparatus for performing a random access procedure (RACH) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, a random access procedure is used by user equipment (UE) to obtain synchronization information of the uplink and to initiate data transfer with the currently camping cell. In Long-Term Evolution (LTE) and LTE Advanced (LTE-A), the random access procedure may be triggered when the UE in idle state attempts to send uplink data, when the UE performs a hand over to a new cell, or when the eNode B (eNB) of the currently serving cell receives downlink data from the network but finds that the uplink synchronization is lost.

The Random Access Procedure (RACH) is the medium access control (MAC) layer procedure. In the IEEE 802 reference model of computer networking, the medium access control or media access control (MAC) layer is the lower sublayer of the data link layer (layer 2) of the seven-layer OSI model. The MAC sublayer provides addressing and channel access control mechanisms that make it possible for several terminals or network nodes to communicate within a multiple access network that incorporates a shared medium. The MAC sublayer acts as an interface between the logical link control (LLC) sublayer and the network's physical layer.

Work has started in the International Telecommunications Union (ITU) and 3GPP to develop requirements and specifications for new radio (NR) 5G systems, e.g., fifth generation systems. For fifth-generation (5G) New Radio systems, the 3rd Generation Partnership Project (3GPP) is currently discussing the framework of the random access procedure for use cases other than an initiation of data transfer. One exemplary application of such cases is UEs to request on-demand system information broadcast.

What is needed, therefore, and example objects of the technology disclosed herein, are methods, apparatus, and techniques to provide random access procedure (RACH) techniques for systems including the 5G system.

SUMMARY

The present disclosure is directed to methods and apparatus for performing a random access procedure (RACH) in wireless communications.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: initiate a random access (RA) procedure for a system information (SI) request; transmit, to a base station (BS), an RA preamble on a physical random access channel (PRACH) resource during the RA procedure; receive, from the BS, a Random Access Response (RAR) including a medium access control (MAC) protocol data unit (PDU) during the RA procedure, the MAC PDU including a first MAC subheader; and consider the RAR reception successful in a case that the first MAC subheader includes a random access preamble identifier (RAPID) corresponding to the RA preamble.

According to another aspect of the present disclosure, a method for performing a system information (SI) request is provided. The method includes: initiating a random access (RA) procedure for the SI request; transmitting, to a base station (BS), an RA preamble on a physical random access channel (PRACH) resource during the RA procedure; receiving, from the BS, a Random Access Response (RAR) including a medium access control (MAC) protocol data unit (PDU) during the RA procedure, the MAC PDU including a first MAC subheader; and considering the RAR reception successful in a case that the first MAC subheader includes a random access preamble identifier (RAPID) corresponding to the RA preamble.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 5A-1, FIG. 5A-2, FIG. 5A-3, FIG. 5A-4, FIG. 5A-5, and FIG. 5A-6 are diagrammatic views showing example formats and example contents of some of the messages comprising the random access procedure of the example embodiment and mode of FIG. 1A.

FIG. 5B-1, FIG. 5B-2, FIG. 5B-3, FIG. 5B-4, FIG. 5B-5, FIG. 5B-6, and FIG. 5B-7 are diagrammatic views showing example formats and example contents of some of the messages comprising the random access procedure of the example embodiment and mode of FIG. 1B.

FIG. 6 is a diagrammatic view which illustrates that downlink information may include both a Physical Downlink Control Channel (PDCCH) and a Physical Downlink Shared Channel (PDSCH).

FIG. 7 is a diagrammatic view which illustrating example associations between preamble indices belonging to a preamble index first group and respective designated requests.

DETAILED DESCRIPTION

Figure 1A:
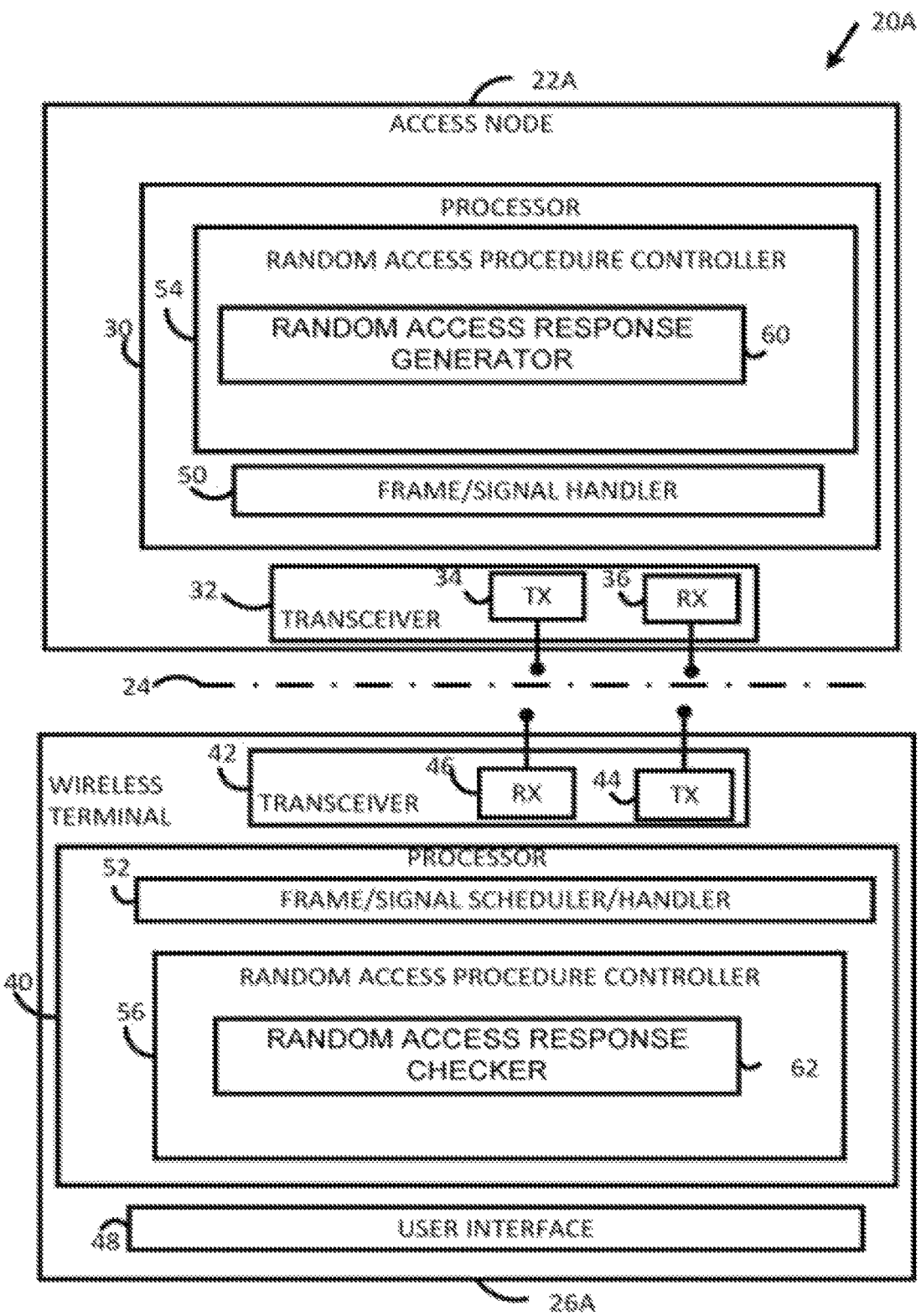
FIG. 1A-FIG. 1E are schematic views showing an example communications system comprising differing configurations of radio access nodes and a wireless terminal which perform random access procedures according to differing example embodiment and modes of the technology disclosed herein.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands may include configured cells. Configured cells can include cells of which a UE terminal is aware and in which it is allowed by a base station to transmit or receive information.

FIG. 1A-FIG. 1E shows example communications systems 20A-20E wherein random access procedures according to example, non-limiting embodiments and modes of the technology disclosed herein are described. In each of FIG. 1A-FIG. 1E, the components and functionalities that have a same base reference numeral have same or similar structure and operation unless otherwise noted or otherwise clear from context. In the example communications systems 20A-20E respective radio access nodes 22A-22E communicate over air or radio interface 24 (e.g., Uu interface) with respective wireless terminals 26A-26E. As used herein, reference to any one of the radio access nodes 22A-22E may, for sake of convenience, be generically noted as node 22, and reference to any one of the wireless terminals 26A-26E maybe also be generically noted as wireless terminal 26.

As mentioned above, the radio access node 22 may be any suitable node for communicating with the wireless terminal 26, such as a base station node, or eNodeB ("eNB") or gNodeB or gNB, for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor circuitry 40 ("terminal processor 40") and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and wireless terminal 26, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., e.g., amplifiers, demodulation circuitry, and other conventional receiver equipment.

In general operation node, access node 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), as a non-limiting example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

Figures 1, 5A:
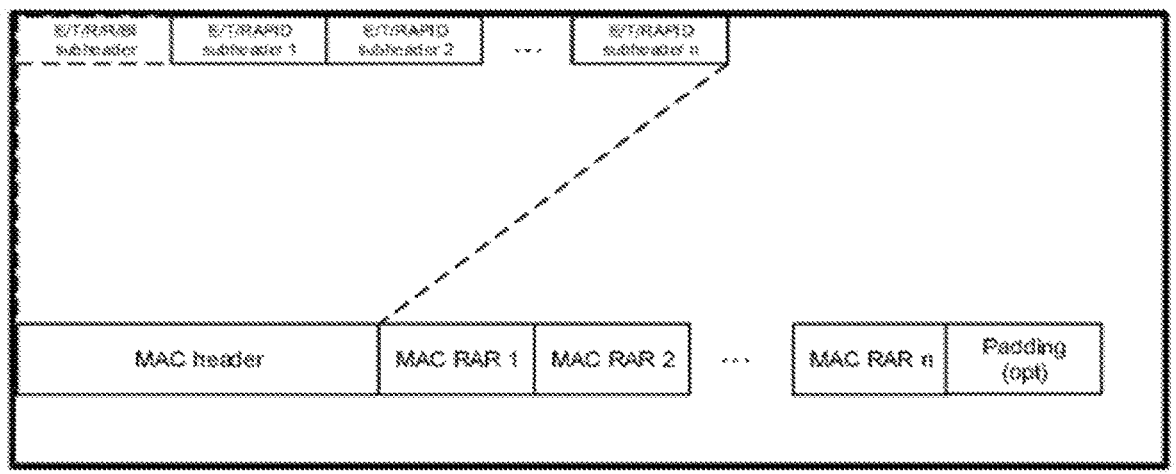

To cater to the transmission of information between radio access node 22A and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52. The terminal processor 40 further comprises synchronization information (SI) generator 54.

The technology disclosed herein particularly concerns random access procedure(s) and the base stations (e.g., radio access nodes) and wireless terminals that participate in the random access procedure(s), and methods of operation of such base stations/nodes and wireless terminals. To this end, radio access node 22A is shown as comprising node random access procedure controller 54 and wireless terminal 26A is shown as comprising terminal random access procedure controller 56. The node random access procedure controller 54 and terminal random access procedure controller 56 participate in the example embodiments and modes of the random access procedures described herein.

An example random access procedure generally includes five phases or aspects as briefly described below:

Initialization Phase: The wireless terminal acquires necessary configuration information broadcasted as System Information from a current serving cell.

Preamble Resource Selection Phase: The wireless terminal selects a random access preamble sequence from the set of sequences available in the serving cell.

Preamble Transmission Phase: In first RACH message (Msg1) the wireless terminal transmits the selected preamble sequence on the physical channel (PRACH) using the radio resources configured by the cell through system information broadcast.

Random Access Response (RAR) Reception Phase: The UE monitors designated downlink channels to receive RAR in a second RACH message (Msg2 which contains necessary information to be used in the subsequent uplink transmissions).

Contention Resolution Phase: When the UE detects successful reception of the RAR, it transmits a message (Msg3), then attempts to receive a message (Msg4) with Contention Resolution Identity that indicates a successful or unsuccessful result of the contention resolution.

The node random access procedure controller 54 and terminal random access procedure controller 56 participate in some or all aspects above described, and do so in manners further described herein with respect to certain example embodiments and modes.

1. FIRST EXAMPLE EMBODIMENT

Figure 2A:
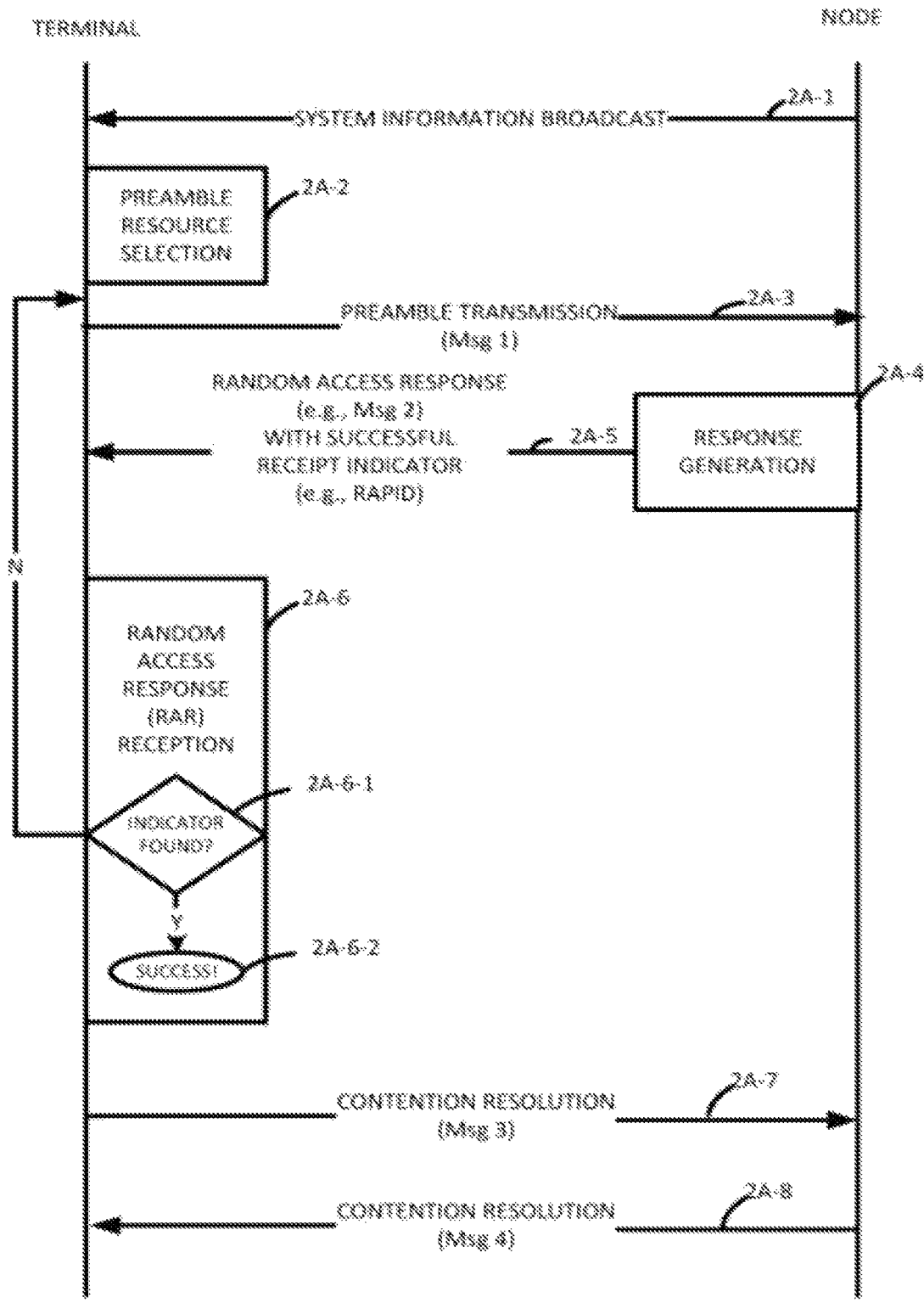
FIG. 2A-FIG. 2E are diagrammatic views of acts including messages comprising the respective random access procedures of FIG. 1A-FIG. 1E.
Figure 3A:
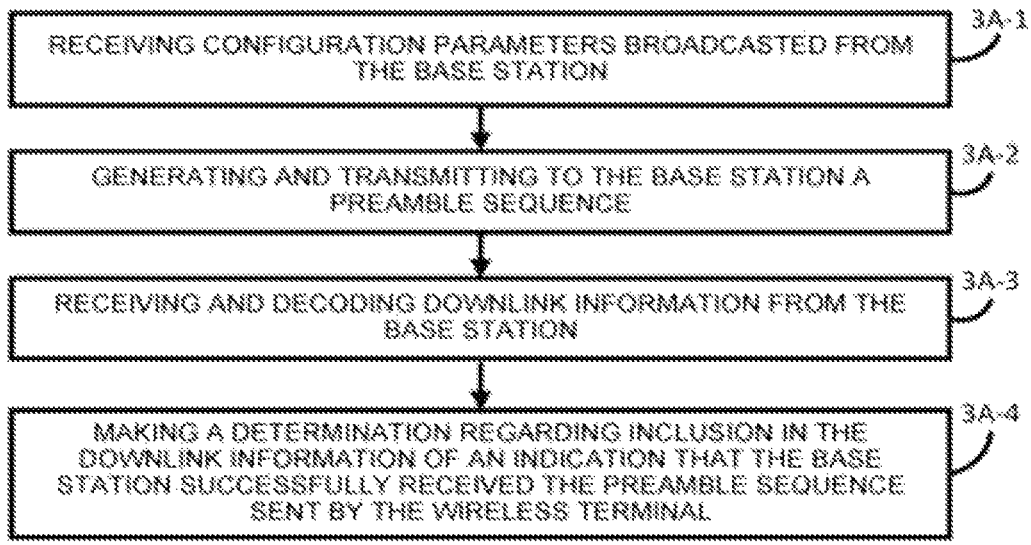
FIG. 3A-FIG. 3C are flowcharts showing example, non-limiting, representative acts or steps performed by the wireless terminals of the systems of FIG. 1A-FIG. 1C, respectively.
Figure 4A:
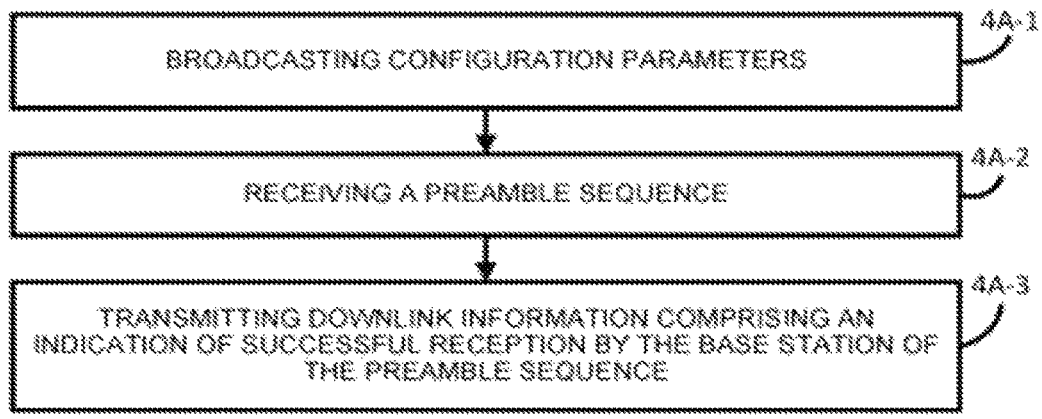
FIG. 4A-FIG. 4C are flowcharts showing example, non-limiting, representative acts or steps performed by the radio access nodes of the systems of FIG. 1A-FIG. 1C, respectively.

A first example embodiment and mode of a random access procedure of the technology disclosed herein is illustrated in FIG. 1A, FIG. 2A, FIG. 3A, FIG. 4A, and FIG. 5A-1, FIG. 5A-2, FIG. 5A-3, FIG. 5A-4, FIG. 5A-5, and FIG. 5A-6. FIG. 1A shows structure and functionalities of radio access node 22A and wireless terminal 26A; FIG. 2A shows acts involved in the random access procedure of the first embodiment including messages; FIG. 3A shows example acts or steps specifically performed by wireless terminal 26A; FIG. 4A shows example acts or steps specifically performed by radio access node 22A; and FIG. 5A-1, FIG. 5A-2, FIG. 5A-3, FIG. 5A-4, FIG. 5A-5, and FIG. 5A-6 show example formats and example contents of some of the messages comprising the random access procedure of the first example embodiment and mode.

As shown in FIG. 1A, the node random access procedure controller 54 of node processor 30 comprises random access response generator 60 and the terminal random access procedure controller 56 of wireless terminal 26A comprises random access response checker 62. As explained herein, according to the first example embodiment and mode the wireless terminal 26A may confirm successful receipt by the radio access node 22A of a preamble sequence transmitted to the radio access node 22A, such confirmation occurring upon receiving, in the Random Access Response (RAR) phase, an indication from the radio access node 22A of successful receipt. In some example implementations of the example embodiments and modes described herein, the indication of successful receipt of the preamble sequence may also be referred to as "RAPID", e.g., random access preamble identifier.

FIG. 2A shows basic example acts involved in the random access procedure of the first embodiment including messages. Act 2A-1 represents the initialization phase and as such depicts the radio access node 22A transmitting, and wireless terminal 26A receiving, configuration parameters. The configuration parameters may be broadcast as system information from the serving cell (e.g., the cell based at radio access node 22A and serving wireless terminal 26 *a*). Act 2A-2 represents the preamble resource selection phase wherein the wireless terminal 26A selects a random access preamble sequence from a set of sequences available in the serving cell. Act 2A-3 represents the preamble transmission phase in which the wireless terminal 26A transmits the selected preamble sequence on a physical channel (PRACH) using radio resources configured by the cell and communicated in act 2A-1. The transmission of act 2A-3 is depicted as the Msg1 of the random access procedure.

Act 2A-4 represents the radio access node 22A processing and generating a response to the preamble transmission message (Msg1) of act 2A-3. In processing the preamble transmission message (Msg1) of act 2A-3, the node random access procedure controller 54 takes note of the preamble sequence included in message Msg1. Further, as act 2A-5 the node random access procedure controller 54 causes the random access response generator 60 to generate a Random Access Response (RAR) message, Msg2, which includes in downlink information an indication of successful receipt of the preamble sequence. The indication of successful receipt of the preamble sequence, herein also known as the "indication". In some example implementations in which the indication relates to a preamble sequence used by the wireless terminal 26 in Msg1 of the random access procedure, the indication may also be referred to as RAPID. Different ways in which the indication of successful receipt of the preamble sequence may be expressed and/or formatted in the Random Access Response Msg2 are described in differing embodiments and modes herein.

Figure 6:
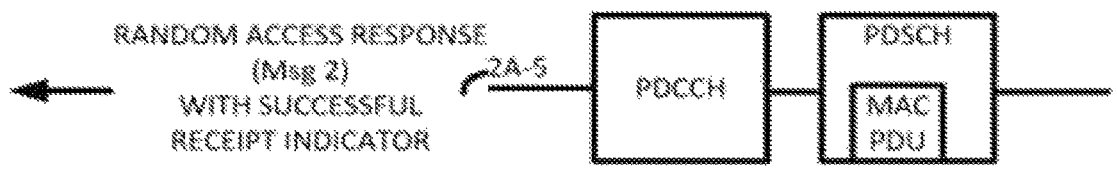

The "downlink information" in which the indication of successful receipt of the preamble sequence is included may include any type of transmission(s) from radio access node 22 to the wireless terminal 26 over the air interface. FIG. 6 illustrates that the downlink information of act 2A-5 and Msg2 (e.g., Random Access Response (RAR)), and other comparable acts and messages described herein, may include both a Physical Downlink Control Channel (PDCCH) and a Physical Downlink Shared Channel (PDSCH). The Physical Downlink Control Channel (PDCCH) and Physical Downlink Shared Channel (PDSCH) may be included in a same frame or message, or in differing frames or messages; in a same subframe, slot or subslot, or in differing subframes, slots, or subslots. As shown in FIG. 6, the Physical Downlink Shared Channel (PDSCH) may comprise or carry one or more Medium Access Control (MAC) packet data units (PDU). In some example embodiments and modes described herein, the indication of successful receipt of the preamble sequence may be included in the Physical Downlink Control Channel (PDCCH), while in other example embodiments and modes the indication of successful receipt of the preamble sequence may be included in the MAC PDU of the Physical Downlink Shared Channel (PDSCH). For example, as herein described with reference to FIG. 5A-1, for one non-limiting example implementation of the first example embodiment and mode, the indication of successful receipt of the preamble sequence is included in a MAC PDU of the Physical Downlink Shared Channel (PDSCH). In an example implementation, the terminal random access procedure controller 56, before receiving the MAC PDU, may monitor a downlink control signal to obtain resource allocation information for the downlink information that comprises the MAC PDU transmission. It should also be appreciated, that for the example embodiments and modes described herein, including the first example embodiment and mode, the indication of successful receipt of the preamble sequence may instead be included in the Physical Downlink Control Channel (PDCCH) (as understood from other subsequently described example embodiments and modes.

Act 2A-6 represents the Random Access Response (RAR) Reception phase. In the Random Access Response (RAR) Reception phase the random access response checker 62 monitors designated downlink (DL) channels by receiving and decoding downlink information. In particular, as act 2A-6-1 random access response checker 62 attempts to find from the downlink information the indication of successful receipt of the preamble sequence. In other words, the random access response checker 62 makes a determination regarding inclusion in the downlink information of an indication that the base station successfully received the preamble sequence sent by the wireless terminal. If the random access response checker 62 makes the determination of inclusion of the indication of successful receipt of the preamble sequence, then the random access response checker 62 can definitively confirm that the preamble sequence was successful sent to and received by radio access node 22A (act 2A-6-2). Otherwise, if the indication of successful receipt of the preamble sequence as not found, the terminal random access procedure controller 56 may retransmit the preamble sequence or indicate a failure of the random access procedure to the upper layer.

For sake of context, FIG. 2A further shows act 2A-7 and act 2A-8 which comprise the Contention Resolution phase. Act 2A-7 comprises the terminal random access procedure controller 56, after successful detection of the Random Access Response (RAR), transmitting a message (e.g., Msg3). Act 2A-8 comprises the terminal random access procedure controller 56 subsequently attempting to receive a message (e.g., Msg4) which includes a contention resolution identity that indicates a successful or unsuccessful result of contention resolution.

FIG. 3A shows example acts or steps specifically performed by wireless terminal 26A. The acts of FIG. 3A may be performed by terminal random access procedure controller 56, which may comprise the terminal processor 40 executing instructions stored on non-transient memory. Act 3A-1 comprises the wireless terminal 26A receiving configuration parameters broadcasted from the base station. Act 3A-2 comprises generating and transmitting to the base station a preamble sequence, e.g., as message Msg1. Act 3A-3 comprise receiving and decoding downlink information from the base station, e.g., in/from message Msg2. Act 3A-4 comprises the random access response checker 62 making a determination regarding inclusion in the downlink information of Msg, an indication that the base station successfully received the preamble sequence sent by the wireless terminal.

FIG. 4A shows example acts or steps specifically performed by radio access node 22A. The acts of FIG. 4A may be performed by node random access procedure controller 54, which may comprise the node processor 30 executing instructions stored on non-transient memory. Act 4A-1 comprises the radio access node 22A broadcasting configuration parameters, e.g., in a system information block (SIB). Act 4A-2 comprises the radio access node 22A receiving (e.g., in message Msg1 from wireless terminal 26A) a preamble sequence generated/selected by wireless terminal 26A. Act 4A-3 comprises the random access response generator 60 generating, and the radio access node 22A transmitting (e.g., as Msg 2), downlink information comprising an indication of successful reception by the base station of the preamble sequence.

FIG. 5A-1, FIG. 5A-2, FIG. 5A-3, FIG. 5A-4, FIG. 5A-5, and FIG. 5A-6 show example formats and example contents of some of the messages comprising the random access procedure of the first example embodiment and mode in an example implementation in which the indication of successful receipt of the preamble sequence is included in a Physical Downlink Shared Channel (PDSCH). As shown in FIG. 5A-1, the MAC PDU carried on the Physical Downlink Shared Channel (PDSCH) may comprise a MAC header and zero or more MAC Random Access Responses (MAC RAR) and optional padding. The MAC header may be of variable size. As further shown in FIG. 5A-1, the MAC PDU header may comprise one or more MAC PDU subheaders; each subheader corresponding to a MAC RAR except for a Backoff Indicator subheader. If included, the Backoff Indicator subheader may be only included once and is the first subheader included within the MAC PDU header. A MAC PDU subheader may comprise the three header fields E/T/RAPID (as described FIG. 5A-2), except for the Backoff Indicator subheader which may comprise the five header field E/T/R/R/BI (as described in FIG. 5A-3). A MAC RAR may comprise the four fields R/Timing Advance Command/UL Grant/Temporary C-RNTI (as shown in FIG. 5A-4, FIG. 5A-5, and FIG. 5A-6). For BL UEs and UEs in enhanced coverage in enhanced coverage level 2 or 3 the MAC RAR in FIG. 5A-5 is used, for a narrow band Internet-of-Things wireless terminal (NB-IoT UE) the MAC RAR in FIG. 5A-6 is used, otherwise the MAC RAR in FIG. 5A-4 is used. A "BL UE" is a Bandwidth reduced Low complexity UE and is a type of machine-type communication device using limited bandwidth of LTE radio.

Figures 2, 5A:
Figures 3, 5A:
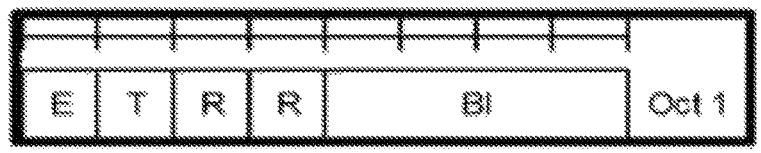

FIG. 5A-1 and FIG. 5A-2 show, for example, that the "indication", e.g., the "RAPID", e.g., random access preamble identifier for some example implementations, may be included in a subheader of the MAC header of the MAC PDU. The indication may thus be included in a medium access control (MAC) protocol data unit (PDU) comprising the downlink data, the MAC PDU may comprise one or more preamble indices.

From the foregoing it will be appreciated that, in an example implementation, the MAC PDU (e.g., of FIG. 5A-1) may comprise a header and a payload, the header further comprising one or a plurality of subheaders, the payload further comprising one or a plurality of Random Access Responses (RARs), each of the subheaders comprising an index of a received preamble being associated with one of the RARs, said association being in such a way that the RARs are arranged in the order of their associated subheaders.

Having provided an overview of the first example embodiment and mode, a more detailed discussion follows and is structured according to the aforementioned example phases of the random access procedure.

1-1 Initialization

The Random Access procedure may be initiated by a Physical Downlink Control Channel (PDCCH) order, by the MAC sublayer itself or by the RRC sublayer. Random Access procedure on a Secondary Cell (SCell) may only be initiated by a PDCCH order. If a MAC entity receives a PDCCH transmission consistent with a PDCCH order masked with its C-RNTI, and for a specific Serving Cell, the MAC entity may initiate a Random Access procedure on this Serving Cell. For Random Access on the Special Cell (SpCell, a serving cell supporting PUCCH transmission and contention based Random Access) a PDCCH order or RRC may optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE and is configured with a non-anchor carrier, perform the Random Access procedure on the anchor carrier.

Before the procedure can be initiated, the following information for related Serving Cell is assumed to be available for UEs other than NB-IoT UEs, BL UEs or UEs in enhanced coverage, unless explicitly stated otherwise:
  the available set of PRACH resources for the transmission of the Random Access Preamble, prach-ConfigIndex.
  the groups of Random Access Preambles and the set of available Random Access Preambles in each group (SpCell only):
  The preambles that are contained in Random Access Preambles group A and Random Access Preambles group B are calculated from the parameters numberOfRA-Preambles and sizeOfRA-PreamblesGroupA:
  If sizeOfRA-PreamblesGroupA is equal to numberOfRA-Preambles then there is no Random Access Preambles group B. The preambles in Random Access Preamble group A are the preambles 0 to sizeOfRA-PreamblesGroupA-1 and, if it exists, the preambles in Random Access Preamble group B are the preambles sizeOfRA-PreamblesGroupA to numberOfRA-Preambles-1 from the set of 64 preambles.
  if Random Access Preambles group B exists, the thresholds, messagePowerOffsetGroupB and messageSizeGroupA, the configured UE transmitted power of the Serving Cell performing the Random Access Procedure, $P_{CMAX, c}$, and the offset between the preamble and Msg3, deltaPreambleMsg3, that are required for selecting one of the two groups of Random Access Preambles (SpCell only).

the RA response window size ra-ResponseWindowSize.

the power-ramping factor powerRampingStep.

the maximum number of preamble transmission preambleTransMax.

the initial preamble power preambleInitialReceivedTargetPower.

the preamble format based offset DELTA_PREAMBLE.

the maximum number of Msg3 HARQ transmissions maxHARQ-Msg3Tx (SpCell only).

the Contention Resolution Timer mac-ContentionResolutionTimer (SpCell only).

NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage:

if the UE is a BL UE or a UE in enhanced coverage:

the available set of PRACH resources associated with each enhanced coverage level supported in the Serving Cell for the transmission of the Random Access Preamble, prach-ConfigIndex.

the groups of Random Access Preambles and the set of available Random Access Preambles in each group (SpCell only):

The preambles that are contained in Random Access Preamble groups for each enhanced coverage level, if it exists, are the preambles firstPreamble to lastPreamble.

If sizeOfRA-PreamblesGroupA is not equal to numberOfRA-Preambles, Random Access Preambles group B exists for all enhanced coverage levels and is calculated as above.

NOTE: If Random Access Preamble group B exists, the eNB should ensure that at least one Random Access Preamble is contained in Random Access Preamble group A and Random Access Preamble group B for all enhanced coverage level.

if the UE is a NB-IoT UE:

the available set of PRACH resources supported in the Serving Cell, nprach-ParametersList.

for random access resource selection and preamble transmission:

a PRACH resource is mapped into an enhanced coverage level.

each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers as configured by higher layers. Each group is referred to as a Random Access Preamble group below in the procedure text.

a subcarrier is identified by the subcarrier index in the range: [nprach-SubcarrierOffset, nprach-SubcarrierOffset+nprach-NumSubcarriers-1]

each subcarrier of a Random Access Preamble group corresponds to a Random Access Preamble.

when the subcarrier index is explicitly sent from the eNB as part of a PDCCH order ra-PreambleIndex shall be set to the signaled subcarrier index.

the mapping of the PRACH resources into enhanced coverage levels is determined according to the following:

the number of enhanced coverage levels is equal to one plus the number of RSRP thresholds present in rsrp-ThresholdsPrachInfoList.

each enhanced coverage level has one PRACH resource present in nprach-ParametersList.

enhanced coverage levels are numbered from 0 and the mapping of PRACH resources to enhanced coverage levels are done in increasing numRepetitionsPerPreambleAttemptorder.

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX, c}$.

the RA response window size ra-ResponseWindowSize and the Contention Resolution Timer mac-ContentionResolution Timer (SpCell only) per enhanced coverage level supported in the Serving Cell.

the power-ramping factor powerRampingStep.

the maximum number of preamble transmission preambleTransMax-CE.

the initial preamble power preambleInitialReceivedTargetPower.

the preamble format based offset DELTA_PREAMBLE. For NB-IoT the DELTA_PREAMBLE is set to 0.

The configuration parameters described above are broadcasted via RRC system information messages.

The following is the structure of the information elements contained in the system information:

```
-- ASN1START
PRACH-ConfigSIB ::= SEQUENCE {
    rootSequenceIndex INTEGER (0..837),
    prach-ConfigInfo PRACH-ConfigInfo
}
PRACH-ConfigSIB-v1310 ::= SEQUENCE {
    rsrp-ThresholdsPrachInfoList-r13 RSRP-ThresholdsPrachInfoList-r13,
    mpdcch-startSF-CSS-RA-r13 CHOICE {
        fdd-r13 ENUMERATED {v1, v1dot5, v2, v2dot5, v4, v5, v8, v10},
        tdd-r13 ENUMERATED {v1, v2, v4, v5, v8, v10, v20, spare}
    } OPTIONAL, -- Cond MP
    prach-HoppingOffset-r13 INTEGER (0..94) OPTIONAL, -- Need OR
    prach-ParametersListCE-r13 PRACH-ParametersListCE-r13
```

```
}
PRACH-Config ::= SEQUENCE {
    rootSequenceIndex INTEGER (0..837),
    prach-ConfigInfo PRACH-ConfigInfo OPTIONAL -- Need
ON
}
PRACH-Config-v1310 ::= SEQUENCE {
    rsrp-ThresholdsPrachInfoList-r13 RSRP-ThresholdsPrachInfoList-
r13 OPTIONAL, -- Cond HO
    mpdcch-startSF-CSS-RA-r13 CHOICE {
        fdd-r13 ENUMERATED {v1, v1dot5, v2, v2dot5, v4, v5, v8,
    v10},
        tdd-r13 ENUMERATED {v1, v2, v4, v5, v8, v10, v20, spare}
    } OPTIONAL, -- Cond
MP
    prach-HoppingOffset-r13 INTEGER (0..94) OPTIONAL, -- Need
OR
    prach-ParametersListCE-r13 PRACH-ParametersListCE-r13 OPTIONAL, -- Cond
MP
    initial-CE-level-r13 INTEGER (0..3) OPTIONAL -- Need OR
}
PRACH-Config-v14xy ::= SEQUENCE {
    rootSequenceIndexHighSpeed-r14 INTEGER (0..837),
    zeroCorrelationZoneConfigHighSpeed-r14 INTEGER (0..12)
}
PRACH-ConfigSCell-r10 ::= SEQUENCE {
    prach-ConfigIndex-r10 INTEGER (0..63)
}
PRACH-ConfigInfo ::= SEQUENCE {
    prach-ConfigIndex INTEGER (0..63),
    highSpeedFlag BOOLEAN,
    zeroCorrelationZoneConfig INTEGER (0..15),
    prach-FreqOffset INTEGER (0..94)
}
PRACH-ParametersListCE-r13 ::= SEQUENCE (SIZE(1..maxCE-Level-r13)) OF PRACH-
ParametersCE-r13
PRACH-ParametersCE-r13 ::= SEQUENCE {
    prach-ConfigIndex-r13 INTEGER (0..63),
    prach-FreqOffset-r13 INTEGER (0..94),
    prach-StartingSubframe-r13 ENUMERATED tsf2, sf4, sf8, sf16, sf32, sf64, sf128,
    sf256} OPTIONAL, -- Need
OP
    maxNumPreambleAttemptCE-r13
    ENUMERATED {n3, n4, n5, n6, n7, n8, n10} OPTIONAL, -- Need
OP
    numRepetitionPerPreambleAttempt-r13 ENUMERATED
{n1,n2,n4,n8,n16,n32,n64,n128},
    mpdcch-NarrowbandsToMonitor-r13 SEQUENCE (SIZE(1..2)) OF
    INTEGER (1..maxAvailNarrowBands-r13),
    mpdcch-NumRepetition-RA-r13 ENUMERATED {r1, r2, T4, r8, r16,
    r32, r64, r128, r256},
    prach-HoppingConfig-r13 ENUMERATED {on,off}
}
RSRP-ThresholdsPrachInfoList-r13 ::= SEQUENCE (SIZE(1..3)) OF RSRP-Range
-- ASN1STOP
-- ASN1START
RACH-ConfigCommon ::= SEQUENCE {
    preambleInfo SEQUENCE {
        numberOfRA-Preambles ENUMERATED {
    n4, n8, n12, n16, n20, n24, n28,
    n32, n36, n40, n44, n48, n52, n56,
    n60, n64},
        preamblesGroupAConfig SEQUENCE {
            sizeOfRA-PreamblesGroupA ENUMERATED {
    n4, n8, n12, n16, n20, n24, n28,
    n32, n36, n40, n44, n48, n52, n56,
    n60},
            messageSizeGroupA ENUMERATED {b56, b144, b208, b256},
            messagePowerOffsetGroupB ENUMERATED {
    minusinfinity, dB0, dB5, dB8, dB10, dB12,
    dB15, dB18},
            ...
        } OPTIONAL -- Need OP
    },
    powerRampingParameters PowerRampingParameters,
    ra-SupervisionInfo SEQUENCE {
        preambleTransMax PreambleTransMax,
        ra-ResponseWindowSize ENUMERATED {
    sf2, sf3, sf4, sf5, sf6, sf7,
```

```
    sf8, sf10},
        mac-ContentionResolutionTimer ENUMERATED {
    sf8, sf16, sf24, sf32, sf40, sf48,
    sf56, sf64}
    },
        maxHARQ-Msg3Tx INTEGER (1..8),
    ...,
    [[ preambleTransMax-CE-r13 PreambleTransMax OPTIONAL, -- Need
OR
        rach-CE-LevelInfoList-r13 RACH-CE-Level InfoList-r13 OPTIONAL -- Need
OR
    ]]
}
RACH-ConfigCommon-v1250 ::= SEQUENCE {
    txFailParams-r12 SEQUENCE {
        connEstFailCount-r12 ENUMERATED {n1, n2, n3, n4},
        connEstFailOffsetValidity-r12 ENUMERATED {s30, s60, s120, s240,
    s300, s420, s600, 5900},
        connEstFailOffset-r12 INTEGER (0..15) OPTIONAL --Need OP
    }
}
RACH-ConfigCommonSCell-r11 ::= SEQUENCE {
    powerRampingParameters-r11 PowerRampingParameters,
    ra-SupervisionInfo-r11 SEQUENCE {
        preambleTransMax-r11 PreambleTransMax
    },
    ...
}
RACH-CE-LevelInfoList-r13 ::= SEQUENCE (SIZE (1..maxCE-Level-r13)) OF RACH-CE-
LevelInfo-r13
RACH-CE-LevelInfo-r13 ::= SEQUENCE {
    preambleMappingInfo-r13 SEQUENCE {
        firstPreamble-r13 INTEGER(0..63),
        lastPreamble-r13 INTEGER(0..63)
    },
    ra-ResponseWindowSize-r13 ENUMERATED {sf20, sf50, sf80, sf120, sf180,
    sf240, sf320, sf400},
        mac-ContentionResolutionTimer-r13 ENUMERATED {sf80, sf100, sf120,
    sf160, sf200, sf240, sf480, sf960},
        rar-HoppingConfig-r13 ENUMERATED {on,off},
    ...
}
PowerRampingParameters ::= SEQUENCE {
    powerRampingStep ENUMERATED {dB0, dB2,dB4, dB6},
    preambleInitialReceivedTargetPower ENUMERATED {
    dBm-120, dBm-118, dBm-116, dBm-114, dBm-112,
    dBm-110, dBm-108, dBm-106, dBm-104, dBm-102,
    dBm-100, dBm-98, dBm-96, dBm-94,
    dBm-92, dBm-90}
}
PreambleTransMax ::= ENUMERATED {
    n3, n4, n5, n6, n7, n8, n10, n20, n50,
    n100, n200}
-- ASN1STOP
```

The Random Access procedure may be performed as follows:

Flush the Msg3 buffer;
set the PREAMBLE_TRANSMISSION_COUNTER to 1;
if the UE is an NB-IoT UE, a BL UE or a UE in enhanced coverage:
    set the PREAMBLE_TRANSMISSION_COUNTER_CE to 1;
    if the starting enhanced coverage level, or for NB-IoT the starting number of NPRACH repetitions, has been indicated in the PDCCH order which initiated the Random Access procedure, or if the starting enhanced coverage level has been provided by upper layers:
        the MAC entity considers itself to be in that enhanced coverage level regardless of the measured RSRP;

else:
    if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
        the MAC entity considers to be in enhanced coverage level 3;
    else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
        the MAC entity considers to be in enhanced coverage level 2;

else if the measured RSRP is less than the RSRP threshold of enhanced coverage level 1 as configured by upper layers in rsrp-ThresholdsPrachInfoList then:
  the MAC entity considers to be in enhanced coverage level 1;
else:
  the MAC entity considers to be in enhanced coverage level 0;
set the backoff parameter value to 0 ms;
for the RN, suspend any RN subframe configuration;
proceed to the selection of the Random Access Resource.
NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

2. SECOND EXAMPLE EMBODIMENT

Figure 1B:
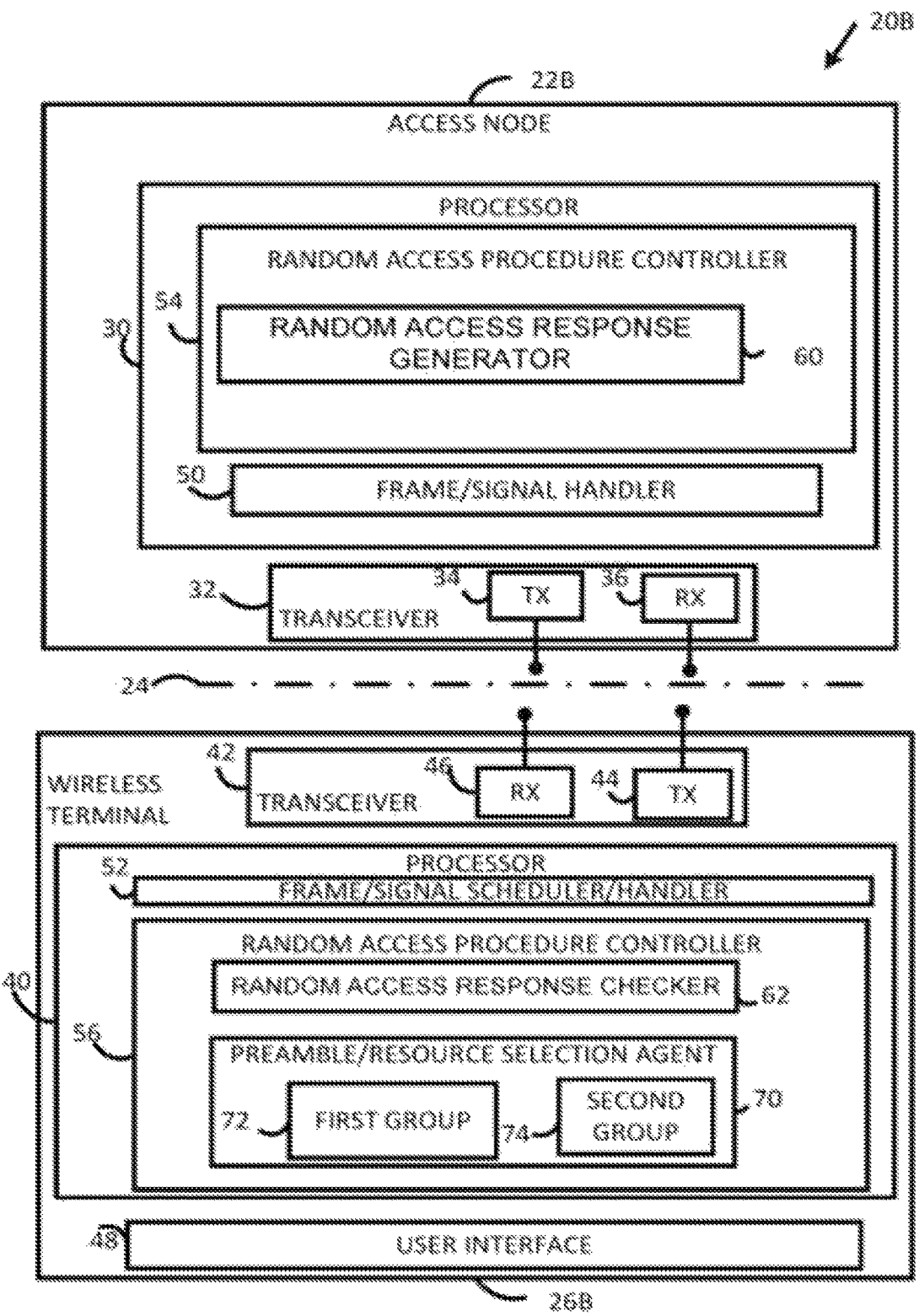
Figure 2B:
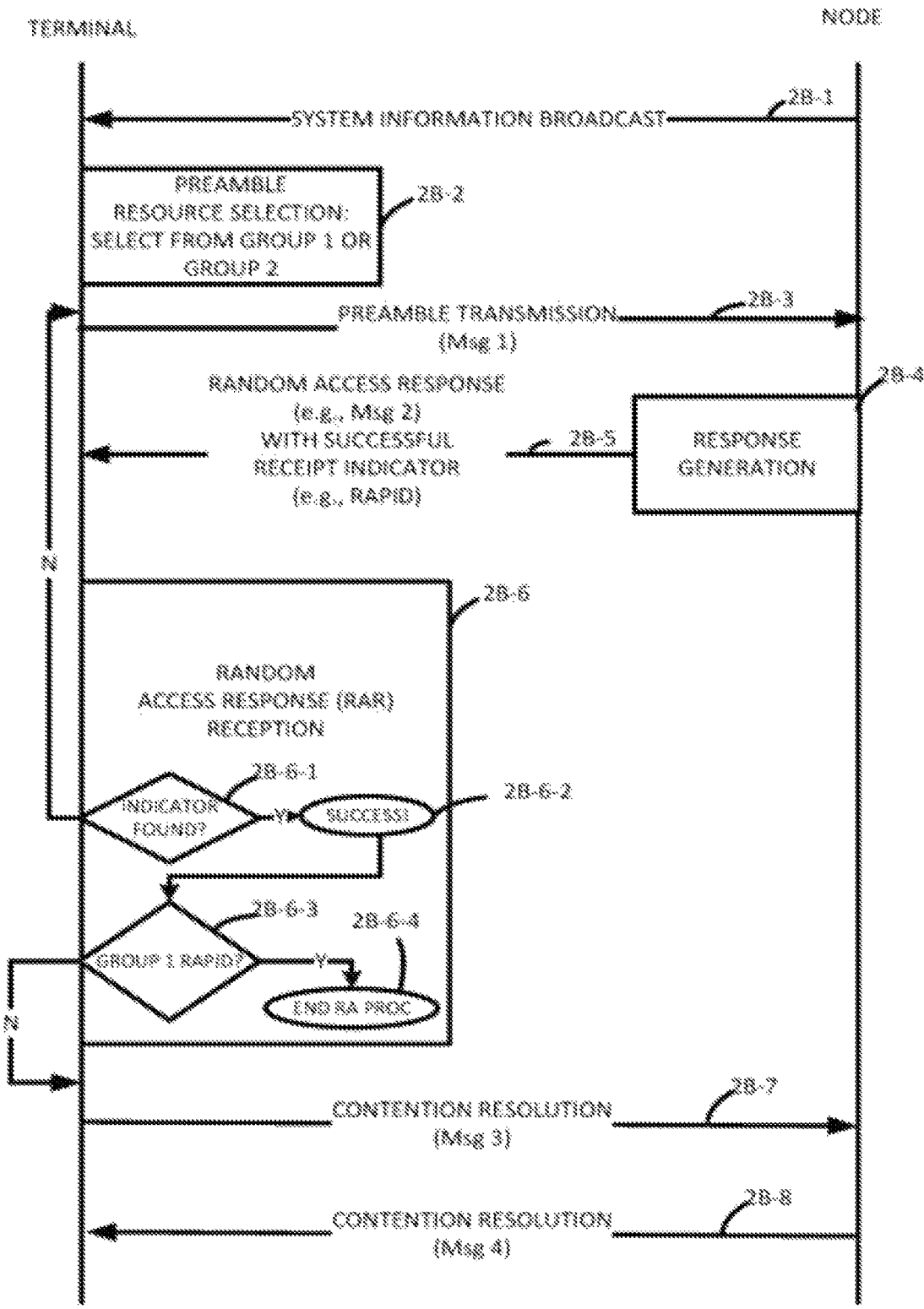
Figure 3B:
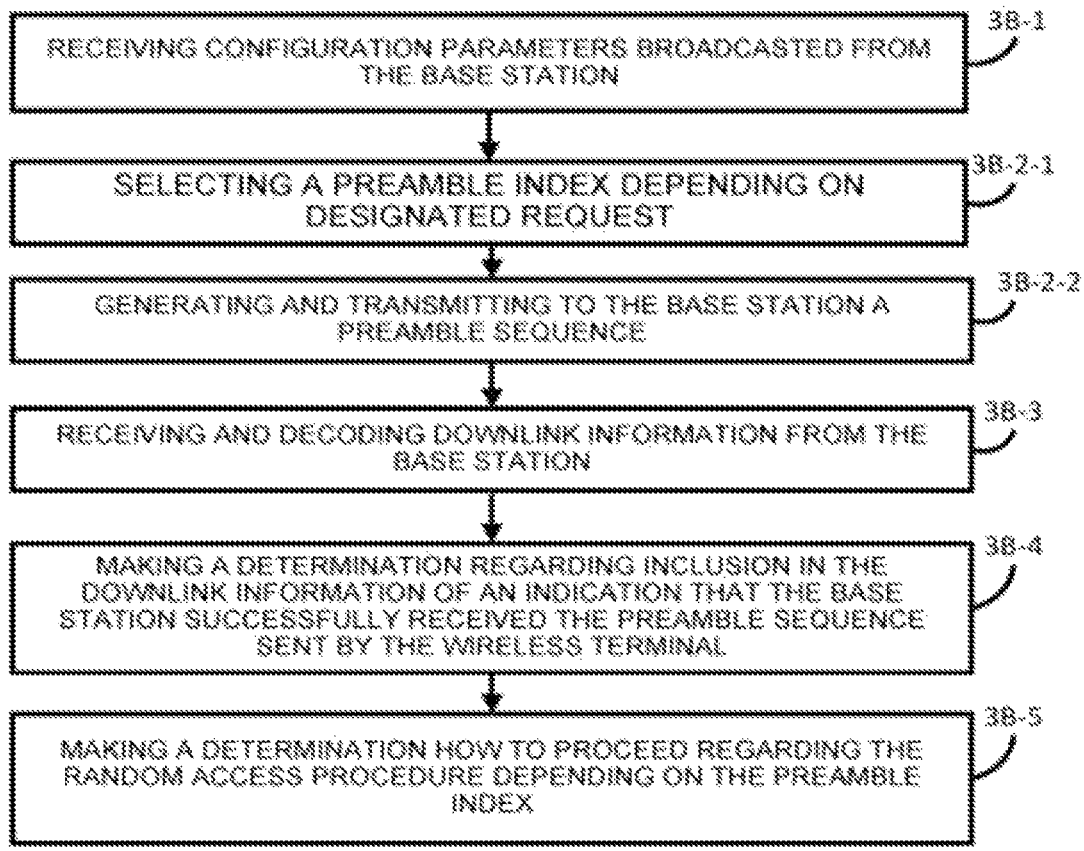
Figure 4B:
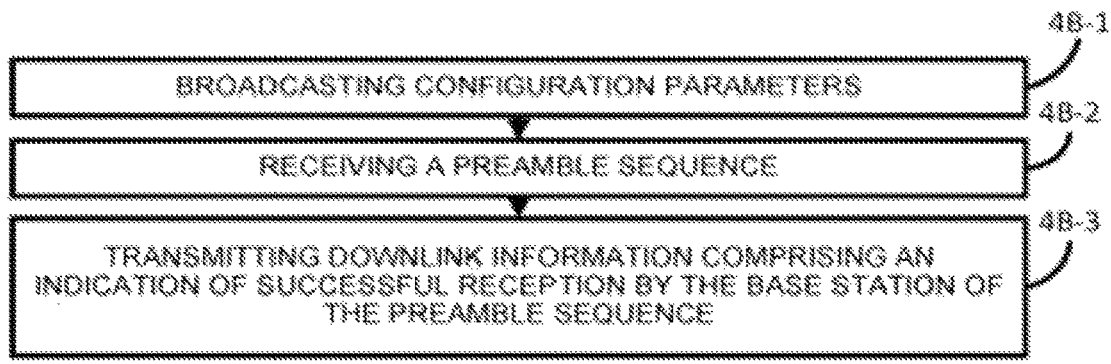

A second example embodiment and mode of a random access procedure of the technology disclosed herein is illustrated in FIG. 1B, FIG. 2B, FIG. 3B, FIG. 4B, and FIG. 5B-1, FIG. 5B-2, FIG. 5B-3, FIG. 5B-4, FIG. 5B-5, and FIG. 5B-6. FIG. 1B shows structure and functionalities of radio access node 22B and wireless terminal 26B; FIG. 2B shows acts involved in the random access procedure of the second embodiment including messages; FIG. 3B shows example acts or steps specifically performed by wireless terminal 26B; FIG. 4B shows example acts or steps specifically performed by radio access node 22B; and FIG. 5B-1, FIG. 5B-2, FIG. 5B-3, FIG. 5B-4, FIG. 5B-5, and FIG. 5B-6 show example formats and example contents of some of the messages comprising the random access procedure of the second example embodiment and mode.

As shown in FIG. 1B, the node random access procedure controller 54 of node processor 30 comprises random access response generator 60. The terminal random access procedure controller 56 of wireless terminal 26B comprises random access response checker 62 and preamble/resource selection agent 70. As explained herein, according to the second example embodiment and mode the wireless terminal 26B may select a preamble index from a first preamble index group that is reserved and distinct for a set of designated requests, and may confirm successful receipt of a preamble sequence to the radio access node 22B and even terminate the random access procedure upon receiving from the radio access node 22B, in the Random Access Response (RAR) phase, an indication of successful receipt that evidences or relates to the selected preamble and/or its index. As with some other example implementations of the example embodiments and modes described herein, the indication of successful receipt of the preamble sequence may also be referred to as "RAPID", e.g., random access preamble identifier.

As shown in FIG. 1B, the preamble/resource selection agent 70 is configured to select a preamble index from one of plural preamble index groups. For sake of simplicity, two such preamble index groups are shown in FIG. 1B: preamble index first group 72 and preamble index second group 74. In other example implementations a greater number of groups may be provided. In the second example embodiment and mode, the preamble indices of the preamble index first group 72 are reserved and distinct for a set of designated requests.

By "designated request" is meant some type of request, information, or action (not necessarily related to the random access procedure itself) which is sent from the wireless terminal 26B to the radio access node 22B. On the other hand, the preamble indices of the preamble index second group 74 are allocated to other purposes, e.g., purpose other than the designated requests of preamble index first group 72, including radio link connection establishment.

Figure 7:
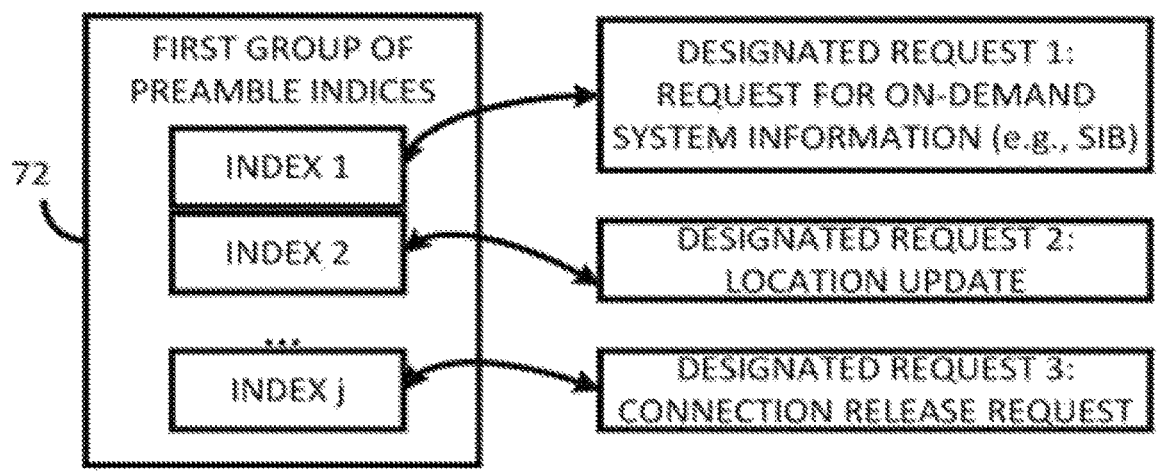

FIG. 7 shows that there may be an association between a preamble index of the preamble index first group 72 and a particular designated request. The associations between the preamble indices of the preamble index first group 72 and the designated request types may be predetermined, or may be dynamically changed by the network. As shown in FIG. 7, the associations may be one-to-one association, or alternatively or additionally plural preamble indices may be associated with a particular designated request. As shown in FIG. 7, one or more of the designated requests may be a request for on-demand delivery of system information, e.g., on-demand request of SIB(s). In fact, multiple preamble indices may be reserved for multiple SIBs/SIB groups.

A request for on-demand delivery of system information is just one type of designated request to which a preamble index of preamble index first group 72 may be associated. Other types of designated requests (illustrated in FIG. 7) may include, by way of non-limiting example: location updates and connection release requests, and similar types of requests.

In another example implementation, each preamble index of preamble index first group 72 and its association to a designated request may be pre-configured at wireless terminal 26B. Alternatively, in another example implementation, each preamble index of preamble index first group 72 and its association to a designated request may be configured by the radio access node 22B, e.g., determined by the radio access node 22B and provided to the wireless terminal 26B.

FIG. 2B shows basic example acts involved in the random access procedure of the second embodiment including messages. Act 2B-1 represents the initialization phase and as such depicts the radio access node 22B transmitting, and wireless terminal 26A receiving, configuration parameters. The configuration parameters may be broadcast as system information from the serving cell (e.g., the cell based at radio access node 22B and serving wireless terminal 26B). Act 2B-2 represents the preamble resource selection phase wherein the wireless terminal 26B selects a random access preamble sequence from a set of sequences available in the serving cell. In the second example embodiment and mode, in the preamble resource selection phase the preamble/resource selection agent 70 has the choice of selecting a preamble index from the preamble index first group 72 or the preamble index second group 74 (or any other available groups). If this particular instance of the random access procedure is for a designated request, such as (for example) an on-demand request for system information, the preamble/resource selection agent 70 selects an appropriate preamble index for the designated requested from preamble index first group 72. Otherwise, if not for a designated request, the preamble/resource selection agent 70 selects the preamble index from preamble index second group 74.

Act 2B-3 represents the preamble transmission phase in which the wireless terminal 26A transmits the selected preamble sequence corresponding to the selected preamble index on a physical channel (PRACH) using radio resources configured by the cell and communicated in act 2B-1. The transmission of act 2B-3 is depicted as the Msg1 of the random access procedure.

Act 2B-4 represents the radio access node 22B processing and generating a response to the preamble transmission message (Msg1) of act 2B-3. In processing the preamble transmission message (Msg1) of act 2B-3, the node random access procedure controller 54 takes note of the preamble sequence included in message Msg1. Further, as act 2B-5 the node random access procedure controller 54 causes the random access response generator 60 to generate a Random Access Response (RAR) message, Msg2, which includes in downlink information an indication of successful receipt of the preamble sequence, the concept of "indication" having been previously explained. In the second example embodiment and mode, the indication (e.g., RAPID) may be included in a subheader of a MAC PDU. The particular subheader in which the indication is included corresponds to the particular wireless terminal 26B, which may be one of several wireless terminals with which the radio access node 22B is communicating and thus associated with one of the subheaders in the header of the MAC PDU (see FIG. 5B-1).

Act 2B-6 represents the Random Access Response (RAR) Reception phase. In the Random Access Response (RAR) Reception phase the random access response checker 62 monitors designated downlink (DL) channels by receiving and decoding downlink information. In particular, as act 2B-6-1 random access response checker 62 attempts to find from the downlink information the indication of successful receipt of the preamble sequence. In other words, the random access response checker 62 makes a determination regarding inclusion in the downlink information of an indication that the base station successfully received the preamble sequence sent by the wireless terminal. If the random access response checker 62 makes the determination of inclusion of the indication of successful receipt of the preamble sequence, then as act 2B-6-2 the random access response checker 62 can definitively confirm that the preamble sequence was successful sent to and received by radio access node 22B and proceed to act 2B-6-3. Otherwise, if the indication of successful receipt of the preamble sequence as not found, the terminal random access procedure controller 56 retransmits the preamble sequence (act 2B-3).

Upon successful detection of the indication of successful receipt of the preamble sequence, as act 2B-6-3 the random access response checker 62 further checks if the indication of successful receipt of the preamble sequence pertains to a preamble sequence corresponding to a preamble index of preamble index first group 72. If the check of act 2B-6-3 is affirmative, e.g., if the indication of successful receipt of the preamble sequence pertains to a preamble index belonging to preamble index first group 72, then as act 2B-6-4 the terminal random access procedure controller 56 realizes that the designated requested has been acknowledged, and can therefore essentially terminate the random access procedure. But if the indication of successful receipt of the preamble sequence pertains to a preamble index of preamble index second group 74, the terminal random access procedure controller 56 continues with the remainder of the random access procedure as indicated by other acts of FIG. 2B, e.g., contention resolution acts 2B-7 and 2B-8.

Thus, as understood, e.g., from FIG. 2B, the wireless terminal 26B processes a RAR associated with a subheader comprising one of the first preamble index group as a different format from the format used in RARs associated with subheaders with preamble indices in the second preamble index group.

FIG. 3B shows example acts or steps specifically performed by wireless terminal 26A. The acts of FIG. 3B may be performed by terminal random access procedure controller 56, which may comprise the terminal processor 40 executing instructions stored on non-transient memory. Act 3B-1 comprises the wireless terminal 26A receiving configuration parameters broadcasted from the base station.

Act 3B-2-1 comprises the preamble/resource selection agent 70 selecting a preamble index from one of preamble index first group 72 and preamble index second group 74. As explained above, whether the preamble/resource selection agent 70 selects a preamble index from preamble index first group 72 or preamble index second group 74, and if from preamble index first group 72, the particular preamble index of preamble index first group 72, depends on whether the random access procedure is for a designated request or not. Thus, in some sense act 3B-2 comprises the preamble/ resource selection agent 70 selecting a preamble index depending on designated request (e.g., whether there is or is not a designated request, and the particular type of designated request when a designated request is to be made). Act 3B-2-2 comprises generating and transmitting to the base station a preamble sequence, e.g., as message Msg1.

Act 3B-3 comprises receiving and decoding downlink information from the base station, e.g., in/from message Msg2. Act 3B-4 comprises the random access response checker 62 making a determination regarding inclusion in the downlink information of an indication that the base station successfully received the preamble sequence sent by the wireless terminal.

Act 3B-5 comprises the random access response checker 62 making a determination how to proceed regarding the random access procedure depending on the preamble index associated with the indication, e.g., depending on membership of the preamble index in either the preamble index first group 72 or the preamble index second group 74. For example, if the indication of successful receipt of the preamble sequence corresponds to a preamble index of preamble index first group 72, the terminal random access procedure controller 56 realizes that the objective of the random access procedure has been acknowledged and accordingly that the random access procedure may be terminated. On the other hand, if the indication of successful receipt of the preamble sequence corresponds to a preamble index of preamble index second group 74, the terminal random access procedure controller 56 continues with other phases of the random access procedure.

FIG. 4B shows example acts or steps specifically performed by radio access node 22B. The acts of FIG. 4B may be performed by node random access procedure controller 54, which may comprise the node processor 30 executing instructions stored on non-transient memory. Act 4B-1 comprises the radio access node 22B broadcasting configuration parameters, e.g., in a system information block (SIB). Act 4B-2 comprises the radio access node 22B receiving a preamble sequence corresponding to the selected preamble index (e.g., in message Msg1 from wireless terminal 26B). Act 4B-3 comprises the random access response generator 60 generating, and the radio access node 22B transmitting, downlink information comprising an indication of successful reception by the base station of the preamble sequence.

FIG. 5B-1, FIG. 5B-2, FIG. 5B-3, FIG. 5B-4, FIG. 5B-5, FIG. 5B-6, and FIG. 5B-7 show example formats and example contents of some of the messages comprising the random access procedure of the first example embodiment and mode in an example implementation in which the indication of successful receipt of the preamble sequence is included in a Physical Downlink Shared Channel (PDSCH). FIG. 5B-1, FIG. 5B-2, FIG. 5B-3, FIG. 5B-4, FIG. 5B-5, FIG. 5B-6 are essentially the same as FIG. 5A-1, FIG. 5A-2, FIG. 5A-3, FIG. 5A-4, FIG. 5A-5, FIG. 5A-6, respectively.

Figure 4C:
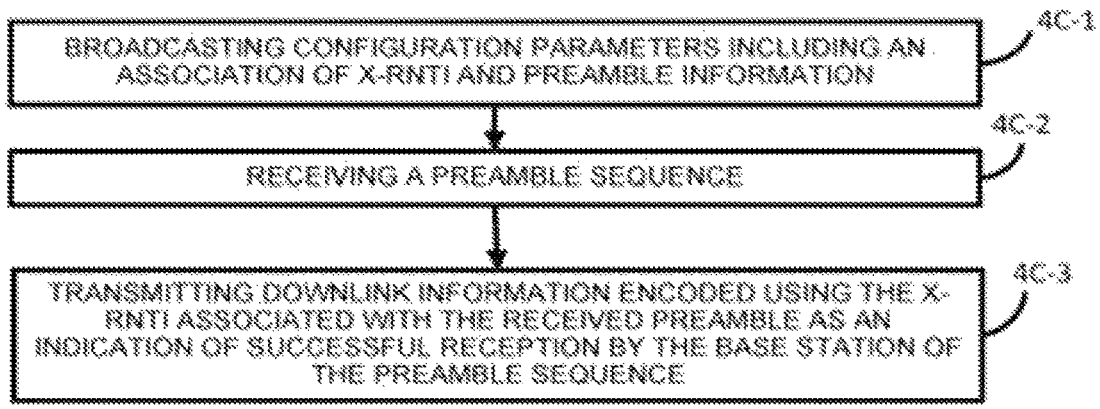
Figures 1, 5B:
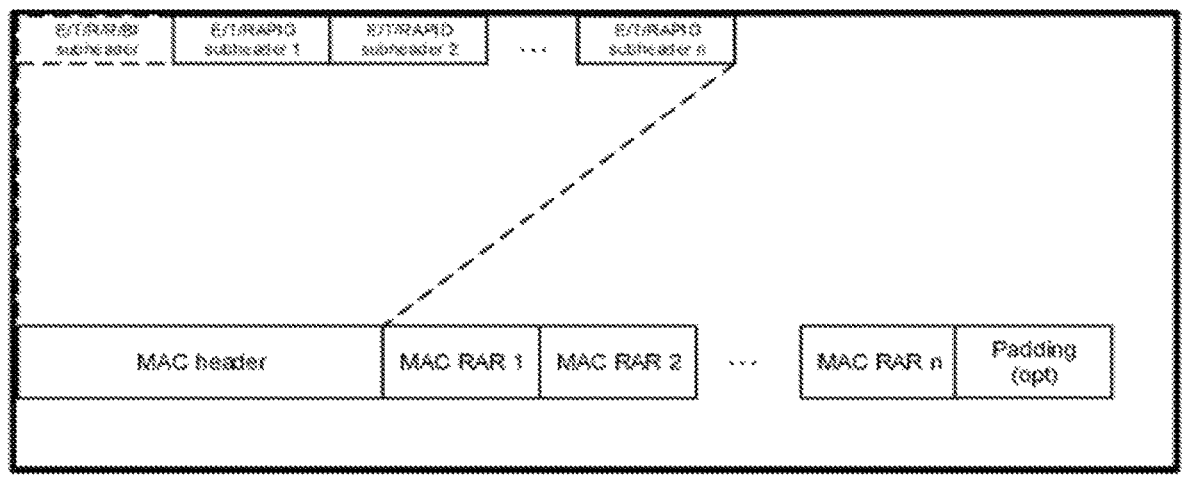
Figures 2, 5B:
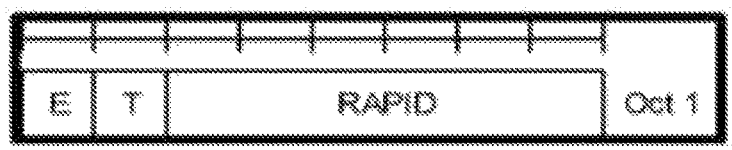
Figures 3, 5B:
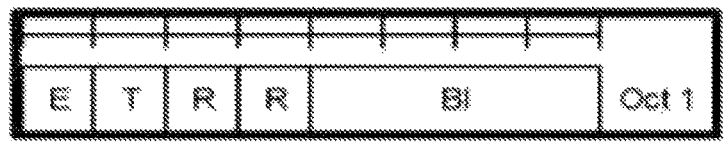

If one of the reserved Random Access Preambles was used, the MAC RAR in FIG. 5B-7 may be used. Otherwise, a MAC RAR may consist of the four fields R/Timing Advance Command/UL Grant/Temporary C-RNTI (as described in FIG. 5B-4, FIG. 5B-5, FIG. 5B-6, and FIG. 5B-7). For BL UEs and UEs in enhanced coverage in enhanced coverage level 2 or 3 the MAC RAR in FIG. 5B-5 is used, for NB-IoT UEs the MAC RAR in FIG. 5B-6 is used, otherwise the MAC RAR in FIG. 5B-4 is used.

Thus, in the second example embodiment and mode, a set of Random Access Preambles (e.g., one or more Random Access Preambles) and/or a set of PRACH resources (e.g., one or more PRACH resources) may be used by upper layer for special purposes. The set of Random Access Preambles and/or the set of PRACH resources described herein may be assumed to be included in the set of Random Access Preambles in some implementations for the sake of simple descriptions.

Specifically, one of such preambles may be selected by the upper layer to inform the network of a designated request/notification using the RACH process (e.g., the RACH procedure) without sending Msg3. For example, in case where the currently serving base station supports on-demand delivery of system information, a set of Random Access Preambles may be reserved for UEs to request transmission of system information blocks (SIBs). Such on-demand-based SIBs may be transmitted for a limited duration only when at least one UE in the coverage sends the request.

In one example configuration and implementation, such a set of preambles may be pre-determined. Namely, for example, such a set of preambles may be defined in advance by the specifications, and may be known information between the base station and the UE. In another configuration, such a set of preambles may be specified by upper layer (RRC), where RRC may acquire such a configuration from network by some periodically broadcasted messages.

In the case where the set of designated preambles to be used by upper layer is configured by the network for requesting on-demand delivery of SIBs, the following exemplary RRC information element may be broadcasted from the eNB. In one configuration, such an information element may be a part of Master Information Block (MIB), while in another configuration it may be a part of a periodically broadcasted SIB. Note that the exemplary information element is not intended to preclude any other possible configuration contents.

```
-- ASN1START
OnDemandSibGroupList ::= SEQUENCE (SIZE (1..maxSIB-1})
OF OnDemandSibGroup
OnDemandSibGroup ::= SEQUENCE {
   sib-TypeList SIB-TypeList,
   ra-PreambleIndex INTEGER (0..63)
}
SIB-TypeList ::= SEQUENCE (SIZE (1..maxSIB-1)) OF SIB-Type
SIB-Type ::= ENUMERATED {
   sibType3, sibType4, sibType5, sibType6,
   sibType7, sibType8, sibType9, sibType10,
   sibType11, sibType12-v920, sibType13-v920,
   sibType14-v1130, sibType15-v1130,
   sibType16-v1130, sibType17-v1250, sibType18-v1250,
   ..., sibType19-v1250, sibType20-v1310, sibType21-v14x0}
}
-- ASN1STOP
```

OnDemandSibGroupList field descriptions
  sib-TypeList
    List of SIB types included in this SIB Group.
  ra-PreambleIndexSibGroup
    Index of the Random Access Preamble reserved for requesting
    the transmission of the SIBs in the SIB Group.

The set of configured Random Access Preambles configured (e.g. ra-PreambleIndexSibGroup in the information element shown above) may be considered to be 'reserved' for upper layer to initiate designated requests/notifications, and therefore the MAC layer of the UE may not use such preambles for any other purposes. Upper layer may inform MAC layer of the reserved set of preamble during the initialization process, along with other configuration parameters.

When the UE decides to initiate a designated request/notification using the RACH process (such as requesting on-demand SIB delivery), the upper layer of the UE may select one of the available Random Access Preambles configured for the request/notification. Upper layer may instruct its MAC layer to initiate the RACH process using the selected Random Access Preamble.

Since Msg3 may not be transmitted in the scenario covered by this embodiment, as a response from the serving base station, a RAR PDU corresponding to the transmitted Random Access Preamble may not contain information necessary for the UE to proceed to the contention resolution phase. Such information may include Timing Advance Command, UL Grant and/or Temporary C-RNTI. In one configuration, the eNB may send reserve bits (e.g. all zeros) in the corresponding fields in the RAR PDU. The MAC entity of the UE, when receiving a MAC PDU comprising a MAC header and MAC RARs, may examine the MAC PDU to check if the Random Access Preamble identifier corresponding to the transmitted Random Access Preamble is included in the MAC header. If so, the MAC entity may ignore some or all part of the corresponding RAR PDU and report successful completion of the Random Access Procedure to the upper layer.

Having provided an overview of the second example embodiment and mode, a more detailed discussion follows and is structured according to the aforementioned example phases of the random access procedure.

2-1 Initialization

The Random Access procedure may be initiated by a Physical Downlink Control Channel (PDCCH) order, by the MAC sublayer itself or by the RRC sublayer. Random Access procedure on a Secondary Cell (SCell) may only be initiated by a PDCCH order. If a MAC entity receives a PDCCH transmission consistent with a PDCCH order masked with its C-RNTI, and for a specific Serving Cell, the MAC entity may initiate a Random Access procedure on this Serving Cell. For Random Access on the Special Cell (SpCell, a serving cell supporting PUCCH transmission and contention based Random Access) a PDCCH order or RRC may optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE and is configured with a non-anchor carrier, perform the Random Access procedure on the anchor carrier. Before the procedure can be initiated, the following information for related Serving Cell is assumed to be available for UEs other than NB-IoT UEs, BL UEs or UEs in enhanced coverage, unless explicitly stated otherwise:

- the available set of PRACH resources for the transmission of the Random Access Preamble, prach-ConfigIndex.
- the groups of Random Access Preambles and the set of available Random Access Preambles in each group (SpCell only):
  The preambles that are contained in Random Access Preambles group A and Random Access Preambles group B are calculated from the parameters numberOfRA-Preambles and sizeOfRA-Preambles-GroupA:
  If sizeOfRA-PreamblesGroupA is equal to numberOfRA-Preambles, then there is no Random Access Preambles group B. The preambles in Random Access Preamble group A are the preambles 0 to sizeOfRA-Preambles-GroupA-1 and, if it exists, the preambles in Random Access Preamble group B are the preambles sizeOfRA-PreamblesGroupA to numberOfRA-Preambles-1 from the set of 64 preambles.
- if Random Access Preambles group B exists, the thresholds, messagePowerOffsetGroupB and messageSize-GroupA, the configured UE transmitted power of the Serving Cell performing the Random Access Procedure, $P_{CMAX, c}$, and the offset between the preamble and Msg3, deltaPreambleMsg3, that are required for selecting one of
- the two groups of Random Access Preambles (SpCell only).
- the set of reserved Random Access Preambles.
- the RA response window size ra-ResponseWindowSize.
- the power-ramping factor powerRampingStep.
- the maximum number of preamble transmission preambleTransMax.
- the initial preamble power preambleinitialReceivedTargetPower
- the preamble format based offset DELTA_PREAMBLE.
- the maximum number of Msg3 HARQ transmissions maxHARQ-Msg3Tx (SpCell only).
- the Contention Resolution Timer mac-ContentionResolutionTimer (SpCell only).
NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage:

if the UE is a BL UE or a UE in enhanced coverage:
- the available set of PRACH resources associated with each enhanced coverage level supported in the Serving Cell for the transmission of the Random Access Preamble, prach-ConfigIndex.
- the groups of Random Access Preambles and the set of available Random Access Preambles in each group (SpCell only):
  The preambles that are contained in Random Access Preamble groups for each enhanced coverage level, if it exists, are the preambles firstPreamble to lastPreamble.
  If sizeOfRA-PreamblesGroupA is not equal to numberOfRA-Preambles, Random Access Preambles group B exists for all enhanced coverage levels and is calculated as above.
NOTE: If Random Access Preamble group B exists, the eNB should ensure that at least one Random Access Preamble is contained in Random Access Preamble group A and Random Access Preamble group B for all enhanced coverage level.

if the UE is a NB-IoT UE:
- the available set of PRACH resources supported in the Serving Cell, nprach-ParametersList.
- for random access resource selection and preamble transmission:
  a PRACH resource is mapped into an enhanced coverage level.
  each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers as configured by higher layers. Each group is referred to as a Random Access Preamble group below in the procedure text.
  a subcarrier is identified by the subcarrier index in the range: [nprach-SubcarrierOffset, nprach-SubcarrierOffset+nprach-NumSubcarriers−1]
  each subcarrier of a Random Access Preamble group corresponds to a Random Access Preamble.
  when the subcarrier index is explicitly sent from the eNB as part of a PDCCH order ra-PreambleIndex shall be set to the signaled subcarrier index.
- the mapping of the PRACH resources into enhanced coverage levels is determined according to the following:
  the number of enhanced coverage levels is equal to one plus the number of RSRP thresholds present in rsrp-ThresholdsPrachInfoList.
  each enhanced coverage level has one PRACH resource present in nprach-ParametersList.
  enhanced coverage levels are numbered from 0 and the mapping of PRACH resources to enhanced coverage levels are done in increasing numRepetitionsPerPreambleAttemptorder.
- the criteria to select PRACH resources based on RSRP measurement per enhanced coverage level supported in the Serving Cell rsrp-ThresholdsPrachInfoList.
- the maximum number of preamble transmission attempts per enhanced coverage level supported in the Serving Cell maxNumPreambleAttemptCE.
- the number of repetitions required for preamble transmission per attempt for each enhanced coverage level supported in the Serving Cell numRepetitionPerPreambleAttempt.
- the configured UE transmitted power of the Serving Cell performing the Random Access Procedure, $P_{CMAX, c}$.
- the RA response window size ra-ResponseWindowSize and the Contention Resolution Timer mac-ContentionResolution Timer (SpCell only) per enhanced coverage level supported in the Serving Cell.
- the power-ramping factor powerRampingStep.
- the maximum number of preamble transmission preambleTransMax-CE.
- the initial preamble power preambleInitialReceivedTargetPower.
- the preamble format based offset DELTA_PREAMBLE. For NB-IoT the DELTA_PREAMBLE is set to 0.

The Random Access procedure may be performed as follows:
Flush the Msg3 buffer;
set the PREAMBLE_TRANSMISSION_COUNTER to 1;
if the UE is an NB-IoT UE, a BL UE or a UE in enhanced coverage:
   set the PREAMBLE_TRANSMISSION_COUNTER_CE to 1;
   if the starting enhanced coverage level, or for NB-IoT the starting number of NPRACH repetitions, has been indicated in the PDCCH order which initiated the Random Access procedure, or if the starting enhanced coverage level has been provided by upper layers:
      the MAC entity considers itself to be in that enhanced coverage level regardless of the measured RSRP;
   else:
      if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
         the MAC entity considers to be in enhanced coverage level 3;
      else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
         the MAC entity considers to be in enhanced coverage level 2;
      else if the measured RSRP is less than the RSRP threshold of enhanced coverage level 1 as configured by upper layers in rsrp-ThresholdsPrachInfoList then:
         the MAC entity considers to be in enhanced coverage level 1;
      else:
         the MAC entity considers to be in enhanced coverage level 0;
set the backoff parameter value to 0 ms;
for the RN, suspend any RN subframe configuration;
proceed to the selection of the Random Access Resource.
NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

2-2 Preamble Resource Selection

The Random Access Resource selection procedure may be performed as follows:
If, except for NB-IoT, ra-PreambleIndex (Random Access Preamble) and ra-PRACH-MaskIndex (PRACH Mask Index) have been explicitly signaled and ra-PreambleIndex is not 000000:
   the Random Access Preamble and the PRACH Mask Index may be those explicitly signaled;
   else, for NB-IoT, if ra-PreambleIndex (Random Access Preamble) and PRACH resource have been explicitly signaled:
      the PRACH resource may be that explicitly signaled;
   if the ra-PreambleIndex signaled is not 000000:
      the Random Access Preamble may be set to nprach-SubcarrierOffset+(ra-PreambleIndex modulo nprach-NumSubcarriers), where nprach-SubcarrierOffset and nprach-NumSubcarriers may be parameters in the currently used PRACH resource.
else:
   may select the Random Access Preamble group according to the PRACH resource and the support for multi-tone Msg3 transmission. A UE supporting multi-tone Msg3 may only select the single-tone Msg3 Random Access Preambles group if there is no multi-tone Msg3 Random Access Preambles group.
   may randomly select a Random Access Preamble within the selected group.
else if one of the reserved Random Access Preamble is selected by upper layer:
   the Random Access Preamble may be that selected by upper layer.
else the Random Access Preamble is selected by the MAC entity as follows:
If Msg3 has not yet been transmitted, the MAC entity may, for NB-IoT UEs, BL UEs or UEs in enhanced coverage:
   except for NB-IoT, may select the Random Access Preambles group and the PRACH resource corresponding to the selected enhanced coverage level;
   for NB-IoT, may select the PRACH resource corresponding to the selected enhanced coverage level, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
If Msg3 has not yet been transmitted, the MAC entity may, except for BL UEs or UEs in enhanced coverage in case preamble group B does not exists, or for NB-IoT UEs:
   if Random Access Preambles group B exists and any of the following events occur:
      the potential message size (UL data available for transmission plus MAC header and, where required, MAC control elements) is greater than messageSizeGroupA and the pathloss is less than $P_{CMAX,c}$ (of the Serving Cell performing the Random Access Procedure)-preambleInitialReceivedTargetPower-deltaPreambleMsg3-messagePowerOffsetGroupB;
      the Random Access procedure was initiated for the CCCH logical channel and the CCCH SDU size plus MAC header is greater than messageSizeGroupA;
      may select the Random Access Preambles group B;
   else:
      may select the Random Access Preambles group A.
else, if Msg3 is being retransmitted, the MAC entity may:
   may select the same group of Random Access Preambles as was used for the preamble transmission attempt corresponding to the first transmission of Msg3.
randomly select a Random Access Preamble within the selected group, excluding the reserved Random Access Preambles. The random function may be such that each of the allowed selections can be chosen with equal probability;
except for NB-IoT, may set PRACH Mask Index to 0.
determine the next available subframe containing PRACH permitted by the restrictions given by the prach-ConfigIndex (except for NB-IoT), the PRACH Mask Index (except for NB-IoT), physical layer timing requirements and in case of NB-IoT, the subframes occupied by PRACH resources related to a higher enhanced coverage level (a MAC entity may take into account the possible occurrence of measurement gaps when determining the next available PRACH subframe);

if the transmission mode is TDD and the PRACH Mask Index is equal to zero:
  if ra-PreambleIndex was explicitly signaled and it was not 000000 (i.e., not selected by MAC):
    randomly select, with equal probability, one PRACH from the PRACHs available in the determined subframe.
  else:
    randomly select, with equal probability, one PRACH from the PRACHs available in the determined subframe and the next two consecutive subframes.
else:
  determine a PRACH within the determined subframe in accordance with the requirements of the PRACH Mask Index, if any.

for NB-IoT UEs, BL UEs or UEs in enhanced coverage, may select the ra-ResponseWindowSize and mac-ContennonResolutionTimer corresponding to the selected enhanced coverage level and PRACH.

proceed to the Random Access Preamble transmission.

2-3 Random Access Preamble Transmission

See 1-3.

2-4 Random Access Response Reception

Once the Random Access Preamble is transmitted, the MAC entity of the UE may monitor the PDCCH of the SpCell for Random Access Response(s) identified by the RA-RNTI defined below, in the RA Response window which starts at the subframe that contains the end of the preamble transmission plus three subframes and has length ra-ResponseWindowSize configured by RRC. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level.

The RA-RNTI associated with the PRACH in which the Random Access Preamble is transmitted, is computed as:

$$\text{RA-RNTI}=1+t\_id+10*f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$) except for NB-IoT UEs, BL UEs or UEs in enhanced coverage. If the PRACH resource is on a TDD carrier, the f_id is set to fRA, where fRA is a frequency resource index within the considered time instance.

For BL UEs and UEs in enhanced coverage, RA-RNTI associated with the PRACH in which the Random Access Preamble is transmitted, is computed as:

$$\text{RA-RNTI}=1+t\_id+10*f\_id+60*(SFN\_id \bmod(W\text{max}/10))$$

where t_id is the index of the first subframe of the specified PRACH ($0 \leq t\_id < 10$), f_id is the index of the specified PRACH within that subframe, in ascending order of frequency domain ($0 \leq f\_id < 6$), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to fRA.

For NB-IoT UEs, the RA-RNTI associated with the PRACH in which the Random Access Preamble is transmitted, is computed as:

$$\text{RA-RNTI}=1+\text{floor}(SFN\_id/4)$$

where SFN_id is the index of the first radio frame of the specified PRACH.

PDCCH carries DCI (Downlink Control Information), which includes resource assignments for a UE or group of UE's. The base station can transmit many DCI's or PDCCH's in a subframe. When responding to a Random Access Preamble, the base station may generate a DCI with Format 1A or 1C as shown in List 1 and List 2.

List 1 Format 1A
  Flag for format0/format1A differentiation or flag for format0A/format1A differentiation
  Localized/Distributed VRB assignment flag
  Resource block assignment
  Modulation and coding scheme
  HARQ process number—reserved
  New data indicator
  Redundancy version—2 bits
  TPC command for PUCCH
  Downlink Assignment Index—reserved.
  SRS request
  HARQ-ACK resource offset
  SRS timing offset—present only when the DCI format is used
    for scheduling PDSCH in a LAA Scell and the UE is configured
    with uplink transmission on the LAA Scell.

List 2 Format 1C
  1 bit indicates the gap value
  Resource block assignment
  Modulation and coding scheme The generated DCI may be attached with a Cyclic Redundancy Check (CRC) parity bits for error detection. The CRC parity bits may be further scrambled with a corresponding RNTI. In case of the DCI for Random Access Response, the RA-RNTI may be used for scrambling the CRC.

The UE that monitors PDCCH may perform blind decoding of the PDCCH payload as it is not aware of the detailed control channel structure. Specifically, the UE under the process of Random Access Response reception may monitor a set of PDCCH candidates (a set of consecutive Control Channel Elements (CCEs) on which a PDCCH could be mapped). In this process the UE uses the aforementioned RA-RNTI for decoding the candidates.

After successful decoding of a DCI with the RA-RNTI, the UE may attempts to receive the Physical Downlink Shared Channel (PDSCH) whose resource is specified in the Resource block assignment field of the DCI with either format 1A or 1C. Accordingly, the MAC entity of the UE may proceed with processing the DL-SCH transport block received in the assigned PDSCH resources as a MAC PDU (see 1-6) for Random Access Response. The UE may continue PDCCH decoding-PDSCH reception during the RA Response window.

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity may regardless of the possible occurrence of a measurement gap or a Sidelink Discovery Gap for Transmission or a Sidelink Discovery Gap for Reception:
- if the Random Access Response contains a Backoff Indicator subheader:
  - may set the backoff parameter value as indicated by the BI field of the Backoff Indicator subheader.
- else, may set the backoff parameter value to 0 ms.
- if the Random Access Response contains a Random Access Preamble identifier corresponding to the transmitted Random Access Preamble, the MAC entity may:
- if the Random Access Preamble is selected by upper layer:
  - consider this Random Access Response reception successful and the Random Access procedure successfully completed.
- else, consider this Random Access Response reception successful and apply the following actions for the serving cell where the Random Access Preamble was transmitted:
  - may process the received Timing Advance Command (see subclause 5.2);
  - may indicate the preambleInitialReceivedTargetPower and the amount of power ramping applied to the latest preamble transmission to lower layers (i.e., (PREAMBLE_TRANSMISSION_COUNTER-1) *powerRampingStep);
  - if the SCell is configured with ul-Configuration-r14, may ignore the received UL grant otherwise may process the received UL grant value and indicate it to the lower layers;
- if, except for NB-IoT, ra-PreambleIndex was explicitly signaled and it was not 000000 (i.e., not selected by MAC):
  - may consider the Random Access procedure successfully completed.
- else, if, except for NB-IoT, the Random Access Preamble was selected by the MAC entity, or for NB-IoT:
  - may set the Temporary C-RNTI to the value received in the Random Access Response message no later than at the time of the first transmission corresponding to the UL grant provided in the Random Access Response message;
  - if this is the first successfully received Random Access Response within this Random Access procedure:
    - if the transmission is not being made for the CCCH logical channel, may indicate to the Multiplexing and assembly entity to include a C-RNTI MAC control element in the subsequent uplink transmission;
    - may obtain the MAC PDU to transmit from the "Multiplexing and assembly" entity and store it in the Msg3 buffer.
- NOTE: When an uplink transmission is required, e.g., for contention resolution, the eNB may not provide a grant smaller than 56 bits (or 88 bits for NB-IoT) in the Random Access Response.
- NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception may be considered not successful and the MAC entity may:
- if the notification of power ramping suspension has not been received from lower layers:
  - increment PREAMBLE_TRANSMISSION_ COUNTER by 1;
- if the UE is an NB-IoT UE, a BL UE or a UE in enhanced coverage:
  - if PREAMBLE_TRANSMISSION_COUNTER= preambleTransMax-CE+1:
    - if the Random Access Preamble is transmitted on the SpCell:
      - indicate a Random Access problem to upper layers;
      - if NB-IoT:
        - consider the Random Access procedure unsuccessfully completed;
- else:
  - if PREAMBLE_TRANSMISSION_COUNTER= preambleTransMax+1:
    - if the Random Access Preamble is transmitted on the SpCell:
      - indicate a Random Access problem to upper layers;
    - if the Random Access Preamble is transmitted on an SCell:
      - consider the Random Access procedure unsuccessfully completed.
- if in this Random Access procedure, the Random Access Preamble was selected by MAC:
  - based on the backoff parameter, may select a random backoff time according to a uniform distribution between 0 and the Backoff Parameter Value;
  - delay the subsequent Random Access transmission by the backoff time;
- else if the SCell where the Random Access Preamble was transmitted is configured with ul-Configuration-r14:
  - delay the subsequent Random Access transmission until the Random Access Procedure is initiated by a PDCCH order with the same ra-PreambleIndex and ra-PRACH-MaskIndex;
- if the UE is an NB-IoT UE, a BL UE or a UE in enhanced coverage:
  - increment PREAMBLE_TRANSMISSION_COUNTER_CE by 1;
  - if PREAMBLE_TRANSMISSION_COUNTER_CE= maxNumPreambleAttemptCE for the corresponding enhanced coverage level+1:
    - reset PREAMBLE_TRANSMISSION_COUNTER_CE;
    - consider to be in the next enhanced coverage level, if it is supported by the Serving Cell and the UE, otherwise stay in the current enhanced coverage level;
    - select the Random Access Preambles group, ra-ResponseWindowSize, mac-ContennonResolunonTimer, and PRACH resource corresponding to the selected enhanced coverage level. A NB-IoT UE supporting multi-tone Msg3 may only select the single-tone Msg3 Random Access Preambles group if there is no multi-tone Msg3 Random Access Preambles group;

if the UE is an NB-IoT UE:
  if the Random Access Procedure was initiated by a PDCCH order:
    consider the PRACH resource corresponding to the selected enhanced coverage level as explicitly signaled;
  proceed to the selection of a Random Access Resource.

2-5 Contention Resolution:
See 1-5

3. THIRD EXAMPLE EMBODIMENT

The third example embodiment and mode is essentially identical to the second example embodiment and mode, except that the MAC PDU payload does not contain MAC RAR that corresponds to the MAC subheader with the RAPID field being one of the reserved Random Access Preambles. In other words, act 4B-3 when executed for the third example embodiment and mode comprises the random access response generator 60 generating, and the radio access node 22B transmitting, downlink information comprising an indication of successful reception by the base station of the preamble sequence. For the third example embodiment and mode, such indication comprises the RAPID field, but the MAC PDU payload of the indication does not contain MAC RAR that corresponds to the MAC subheader with the RAPID field. In principle, the response of such a reserved preamble transmission associated with an upper layer designated request/notification may not have to contain information for contention resolution. The example of MAC PDU in this embodiment is illustrated in FIG. 8.

Figure 8:
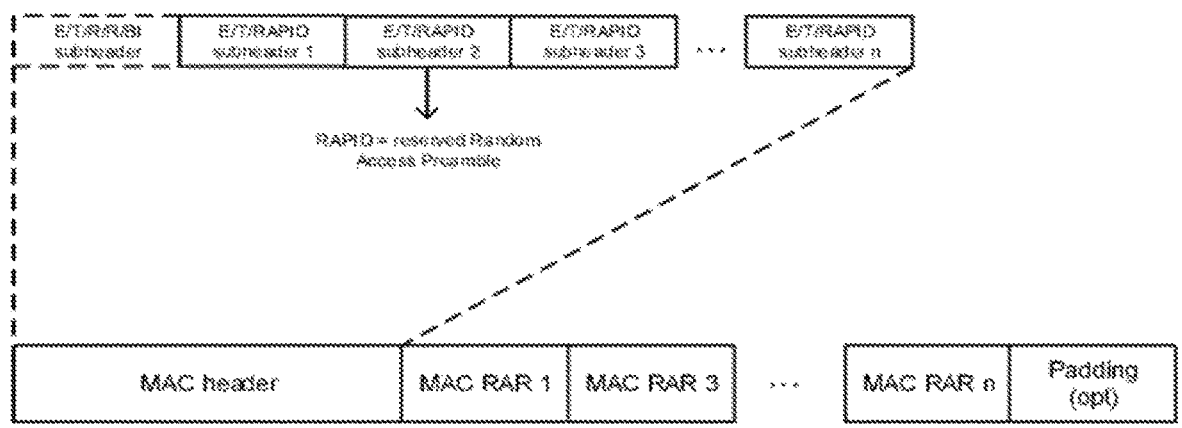
FIG. 8 is a diagrammatic view showing an example formats and example contents of some of a MAC PDU for another example embodiment and mode which is a variation of the example embodiment and mode of FIG. 1B.

In the example MAC PDU shown in FIG. 8, the RAPID of subheader 2 is the reserved preamble index (e.g., selected from preamble index first group 72) and therefore there need be no RAR 2 in the MAC PDU payload. However, it is assumed that the RAPIDs in other subheaders 1, 3, . . . , n are regular preamble indices each of which has associated RAR (1, 3, . . . , n) in the MAC PDU payload. The other RARs are included since the MAC PDU may be monitored not only by the UE that transmitted the reserved preamble but by other UEs that transmitted regular preambles. Each of these other UEs expects to receive one of the RAR fields 1, 3, . . . , n as a regular process proceeding to Msg3 and needs to know that there is no RAR 2, in order to identify the correct RAR.

Thus, for the wireless terminal of the third example embodiment and mode, the terminal random access procedure controller 56 is configured to assume non-presence of a RAR in the payload when a subheader contains one of the preamble index first group 72.

4. FOURTH EXAMPLE EMBODIMENT

In a fourth example embodiment and mode a set of Radio Network Temporary Identifiers (RNTIs) is allocated and configured by the higher layer entity (RRC) of the network in the sake of Random Access Response for some of the designated requests/notifications described in the second embodiment. The set of RNTIs may comprise one or more RNTIs. In an example implementation of the fourth example embodiment and mode, one reserved Random Access Preamble disclosed in the second embodiment is associated with a designated value of RNTI (X-RNTI hereafter). A "reserved" random access preamble includes a random access preamble that is used for designated request(s) such as those described above.

By way of background, there are several different types of Radio Network Temporary Identifiers (RNTIs), including the following:
  C-RNTI: unique identification used for identifying RRC Connection and scheduling;
  RA-RNTI: identification used for the random access procedure (used for indicating initial transmission of Msg.3);
  Temporary C-RNTI: identification used for the random access procedure (used for indicating retransmission of Msg.3);
  SI-RNTI (System Information RNTI): identification used for identifying SI message.

To the above list this fourth example embodiment and mode adds another type of RNTI: the "X-RNTI" which may be an identification used for identifying that a designated request has been received, such as a request of a system information message such as an on-demand system information request. In one example configuration, the values allocated for X-RNTI may be distinct from other types of RNTIs. In another example configuration, the values for X-RNTI may be shared with some other types of RNTIs. For example, the X-RNTI may be equal to SI-RNTI.

Figure 1C:
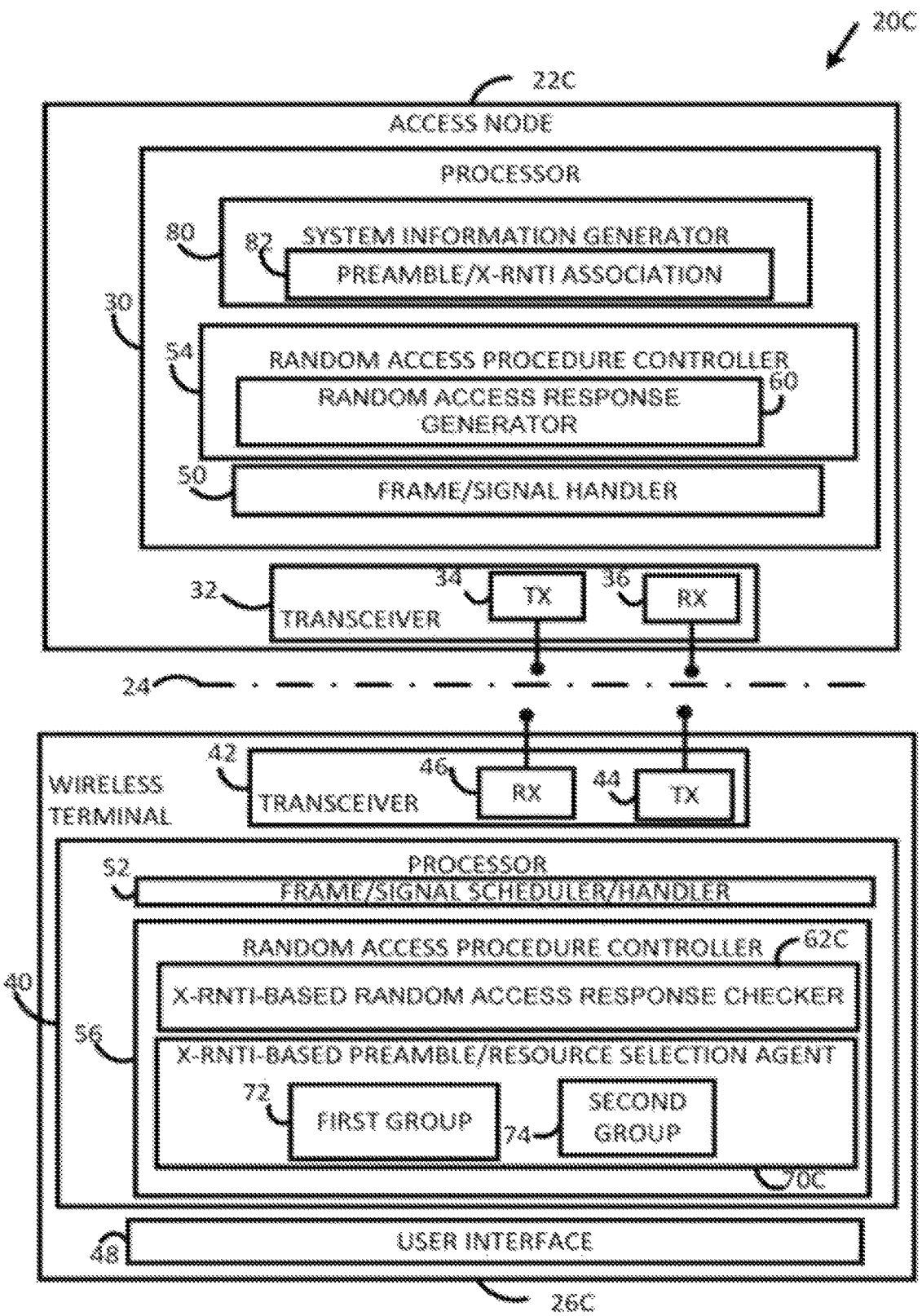
Figure 2C:
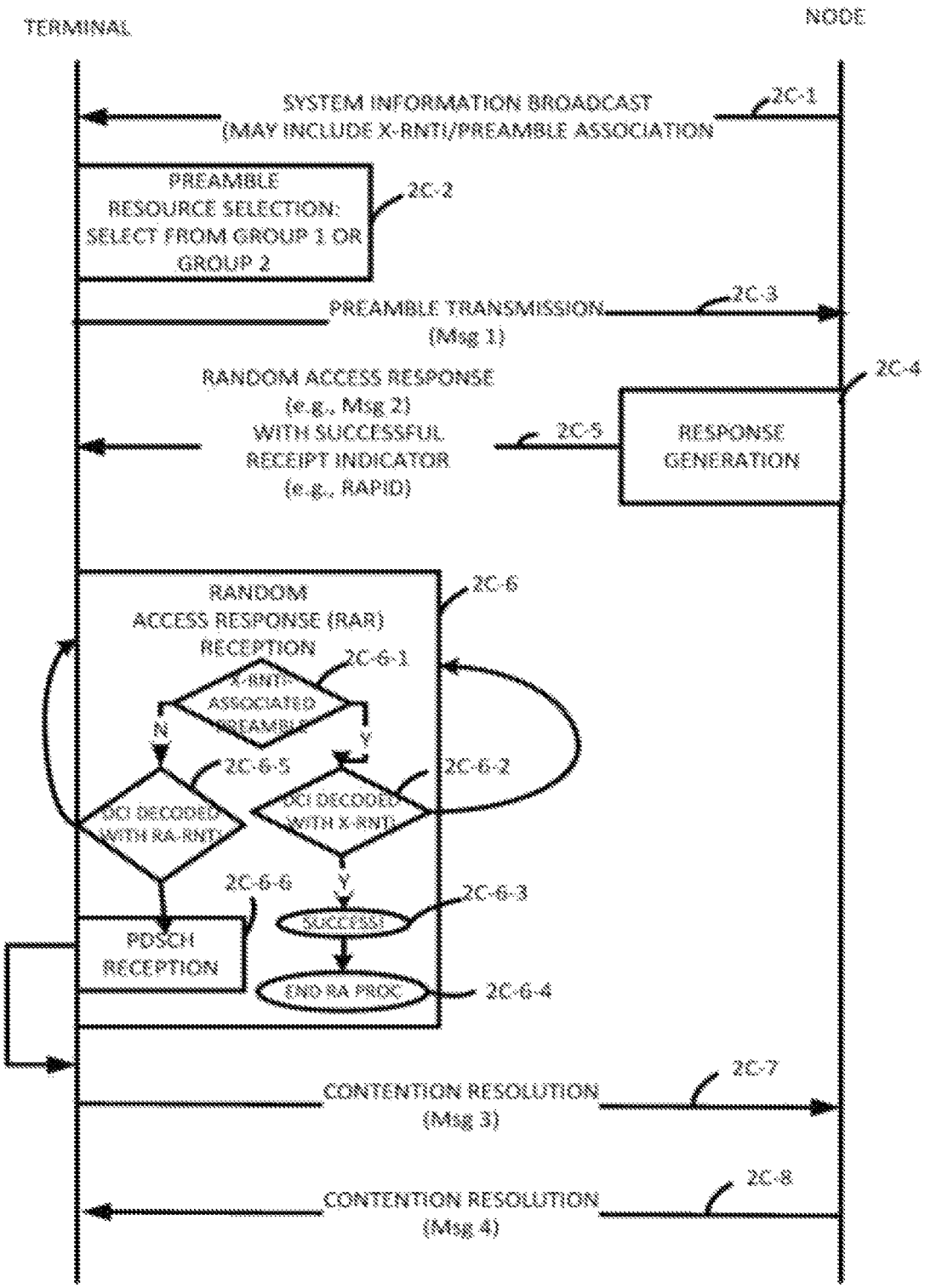
Figure 3C:
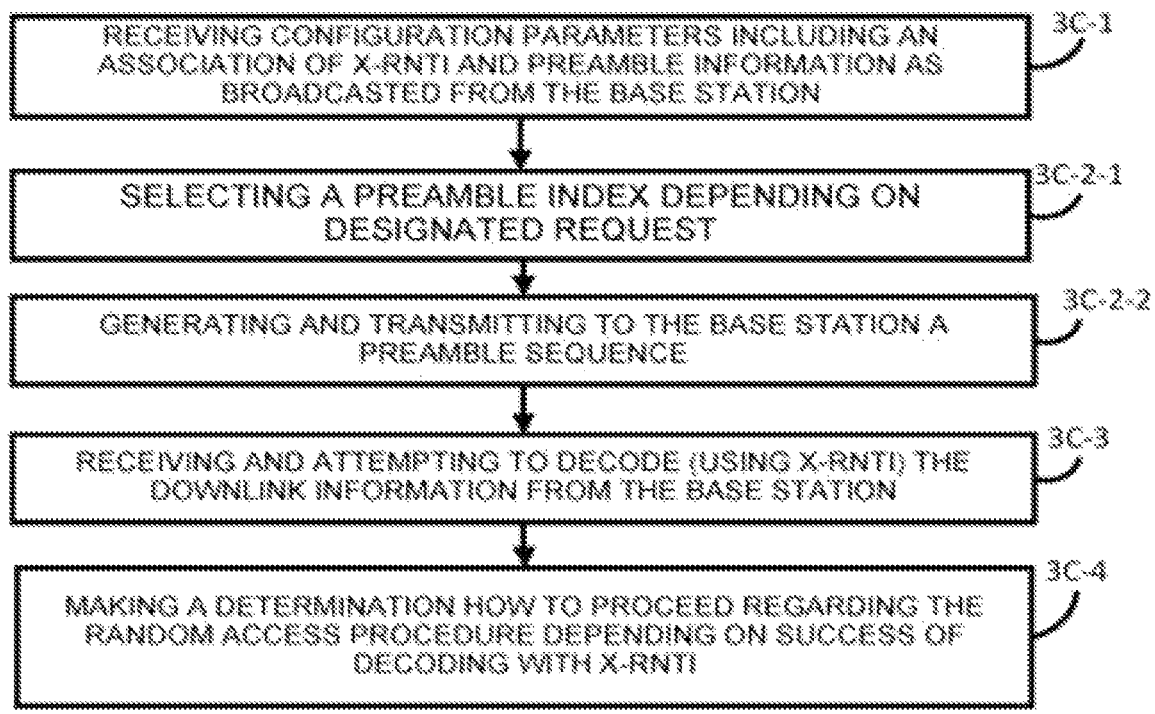

The third example embodiment and mode of a random access procedure of the technology disclosed herein is illustrated in FIG. 1C, FIG. 2C, FIG. 3C, and FIG. 4C. FIG. 1C shows structure and functionalities of radio access node 22C and wireless terminal 26C; FIG. 2C shows acts involved in the random access procedure of the second embodiment including messages; FIG. 3C shows example acts or steps specifically performed by wireless terminal 26C; and, FIG. 4C shows example acts or steps specifically performed by radio access node 22C.

As shown in FIG. 1C, the node processor 30 comprises system information generator 80. The system information generator 80 serves, e.g., to generate system information such as one or more system information blocks (SIBs). The system information generator 80 of FIG. 1C particularly includes X-RNTI/preamble association functionality 82. The X-RNTI/preamble association functionality 82 serves to associates random access preamble information, e.g., a random access preamble index or a preamble sequence, with Radio Network a Temporary Identifier (RNTI), and particularly the X-RNTI as mentioned above.

FIG. 1C further shows that the random access response checker 62C of the terminal random access procedure controller 56 is an X-RNTI-based RAR checker, and the preamble/resource selection agent 70C is an X-RNTI-based selection agent. As with the second and fourth example embodiments and modes, the X-RNTI-based selection agent 70C may select a preamble index from one of plural preamble index groups, e.g., from preamble index first group 72 and preamble index second group 74, wherein the preamble index first group 72 comprises preamble indices which are reserved and distinct for a set of designated requests, as explained above. The X-RNTI-based RAR checker 62C may confirm successful receipt of a preamble sequence by the radio access node 22A and even terminate the random access procedure upon receiving from the radio access node 22A, in the Random Access Response (RAR) phase, an indication of successful receipt that evidences or relates to the selected preamble and/or its index. Both the X-RNTIbased selection agent 70C and the X-RNTI-based RAR checker 62C know an association between the X-RNTI and the random access preamble information.

Figure 9:
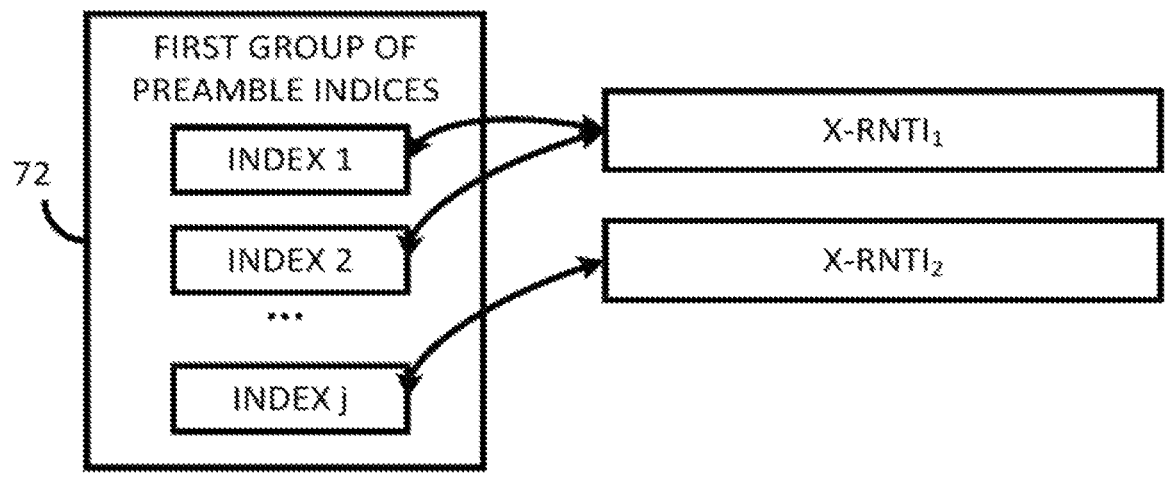
FIG. 9 is a diagrammatic view which illustrating example associations between preamble information and a designated value of Radio Network Temporary Identifiers (RNTIs) (X-RNTI hereafter) for a fourth example embodiment and mode.

FIG. 9 illustrates an example, non-limiting association or mapping between preamble information and X-RNTI for the fourth example embodiment and mode. FIG. 9 particularly shows that one or more indices in the preamble index first group 72 may be associated with or mapped to an X-RNTI. The mapping of reserved Random Access Preambles and X-RNTI may be one-to-one, or N-to-one. In the latter case, more than one reserved Random Access Preambles are associated with one value of X-RNTI. A mapping such as that of FIG. 9 may be configured at wireless terminal 26C, e.g., at X-RNTI-based RAR checker 62C and X-RNTI-based selection agent 70C.

In one example configuration, the associations of preambles and X-RNTIs (depicted, for example, by FIG. 9) may be configured by a system information block (SIB) broadcasted by radio access node 22C. The system information generator 80 of FIG. 1C, using the X-RNTI/preamble association functionality 82 (which has information comparable to FIG. 9), prepares a system information block (SIB) for broadcast, e.g., as act 2C-1 described further here. In some configurations, X-RNTI may be equal to SI-RNTI. For example, in the case where the reserved Random Access Preambles are used for requesting on-demand delivery of SIBs, one exemplary RRC information element to be broadcasted for this configuration is shown below.

```
-- ASN1START
OnDemandSibGroupList ::= SEQUENCE (SIZE (1..maxSIB-1}) OF
OnDemandSibGroup
OnDemandSibGroup ::= SEQUENCE {
   sib-TypeList SIB-TypeList,
   ra-PreambleIndexSibGroup INTEGER (0..63)
   x-RNTI BIT STRING (SIZE (16))
}
SIB-TypeList ::= SEQUENCE (SIZE (1..maxSIB-1)) OF SIB-Type
SIB-Type ::= ENUMERATED {
   sibType3, sibType4, sibType5, sibType6,
   sibType7, sibType8, sibType9,
sibType10,
   sibType11, sibType12-v920, sibType13-
v920,
   sibType14-v1130, sibType15-v1130,
   sibType16-v1130, sibType17-v1250,
sibType18-v1250,
   ..., sibType19-v1250, sibType20-v1310,
sibType21-v14x0}
}
-- ASN1STOP
```

OnDemandSibGroupList field descriptions
   sib-TypeList
      List of SIB types included in this SIB Group.
   ra-PreambleIndexSibGroup
      Index of the Random Access Preamble reserved for requesting
      the transmission of the SIBs in the SIB Group.
   x-RNTI
      This field indicates the X-RNTI associated with
      ra-PreambleIndexSibGroup.

FIG. 2C shows basic example acts involved in the random access procedure of the third embodiment including messages. Act 2C-1 represents the initialization phase and as such depicts the radio access node 22C transmitting, and wireless terminal 26A receiving, configuration parameters. The configuration parameters may be broadcast as system information from the serving cell (e.g., the cell based at radio access node 22C and serving wireless terminal 26C). The configuration parameters may include the X-RNTI/preamble association, such as that depicted by FIG. 9 and understood with reference to the example RRC information element described above.

Act 2C-2 represents the preamble resource selection phase wherein the wireless terminal 26C selects a random access preamble sequence from a set of sequences available in the serving cell. In the fourth example embodiment and mode, like the second example embodiment and mode, in the preamble resource selection phase the X-RNTI-based selection agent 70C has the choice of selecting a preamble index from the preamble index first group 72 or the preamble index second group 74. If this particular instance of the random access procedure is for a designated request, such as (for example) an on-demand request for system information, the X-RNTI-based selection agent 70C selects an appropriate preamble index for the designated requested from preamble index first group 72. Otherwise, if not for a designated request, the X-RNTI-based selection agent 70C selects the preamble index from preamble index second group 74.

Act 2C-3 represents the preamble transmission phase in which the wireless terminal 26C transmits the selected preamble sequence corresponding to the selected preamble index on a physical channel (PRACH) using radio resources configured by the cell and communicated in act 2C-1. The transmission of act 2C-3 is depicted as the Msg1 of the random access procedure.

Act 2C-4 represents the radio access node 22C processing and generating a response to the preamble transmission message (Msg1) of act 2C-3. In processing the preamble transmission message (Msg1) of act 2C-3, the node random access procedure controller 54 takes note of the preamble sequence included in message Msg1. Further, as act 2C-5 the node random access procedure controller 54 causes the random access response generator 60 to generate downlink information which comprises or permits access to a Random Access Response (RAR) message, Msg2, which includes in downlink information an indication of successful receipt of the preamble sequence, the concept of "indication" having been previously explained. At least a portion of the downlink information which is generated as act 2C-4 may be encoded by system information generator 80 using the X-RNTI which, based on X-RNTI/preamble association functionality 82, the radio access node 22C knows is associated with the received preamble sequence. For example, the downlink information may be cyclically redundancy check (CRC) scrambled with the X-RNTI.

After transmitting one of the reserved Random Access Preambles, the wireless terminal 26C may monitor the downlink information received from the radio access node 22C. The terminal random access procedure controller 56 checks at act 2C-6-1 whether the preamble sequence used for Msg1 was associated with an X-RNTI, e.g., was associated with a designated request. If the check at act 2C-6-1 is affirmative, as act 2C-6-2 the terminal random access procedure controller 56 tries to decode the received downlink information using the X-RNTI that is associated with the preamble sequence that was transmitted in the preamble transmission message Msg1. For example, the wireless terminal 26C may monitor the PDCCH as described in the aforementioned embodiment, but in so doing may attempt to decode DCIs with the X-RNTI associated with the transmitted Random Access Preamble. In the particular act 2C-6 of FIG. 2C, the decoded DCI addressed with the X-RNTI does not include scheduling information for PDSCH. In this case, the format of the DCI addressed by the X-RNTI may be format 1A or 1C, but each field of the DCI may contain a pre-determined value. As shown by act 2C-6-2 of FIG. 2C, the wireless terminal 26C attempts to decode the DCI with the X-RNTI associated with the preamble sequence transmitted to the radio access node 22C. If the DCI can be decoded using the X-RNTI, as shown by act 2C-6-3 the wireless terminal 26C may consider a successful decoding of the DCI with X-RNTI as a successful completion of the Random Access procedure. As indicated by act 2C-6-4, the terminal random access procedure controller 56 may at that point terminate the random access procedure without proceeding to PDSCH reception. If the DCI cannot be decoded using the X-RNTI, the wireless terminal 26C may continue monitoring PDCCH, attempting to decode other DCIs with the X-RNTI.

On the other hand, if it were determined as act 2C-6-1 that the transmitted preamble was not associated with an X-RNTI, e.g., that the wireless terminal 26C transmitted a preamble sequence that was other than a reserved preamble sequence (e.g., the wireless terminal 26C transmitted a preamble sequence having a preamble index associated with preamble index second group 74), act 2C-6-5 is performed. As act 2C-6-5 the terminal random access procedure controller 56 may monitor the PDCCH with the RA-RNTI. Namely, the wireless terminal 26C may attempt to decode DCI(s) with the RA-RNTI. In addition, the DCIs addressed with the RA-RNTI (i.e., CRC scrambled with the RA-RNTI) may have been used for scheduling of PDSCH for transmitting Msg.2 (e.g., RAR, see FIG. 5B-4, FIG. 5B-5, and/or FIG. 5B-6). After successful decoding of the DCI the wireless terminal 26C may proceed to PDSCH reception (as indicated by act 2C-6-6), and thereafter proceed with the random access procedure as indicated by the remainder of FIG. 2C. If the DCI cannot be decoded using the RA-RNTI, the wireless terminal 26C may continue monitoring PDCCH, attempting to decode other DCIs with the RA-RNTI.

Figure 10:
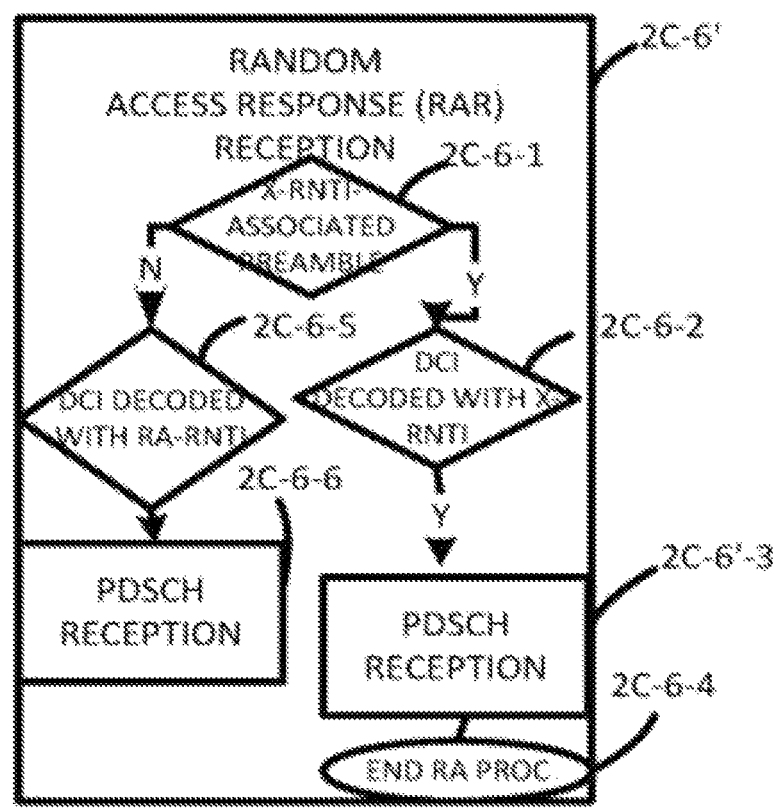
FIG. 10 is a diagrammatic view showing an alternate implementation of the example embodiment and mode of FIG. 2C in a scenario in which downlink control information (DCI) addressed with the X-RNTI may be used for scheduling of PDSCH to transmit a message.

FIG. 10 shows an alternate implementation of act 2C-6 of FIG. 2C, e.g., shows act 2C-6' in a scenario in which a DCI addressed with the X-RNTI may be used for scheduling of PDSCH to transmit Msg.2 (e.g., RAR, see FIG. 5B-7). In this case, the format of the DCI may be format 1A or 1C as shown in List 1 and List 2, respectively. After successful decoding of the DCI as act 2C-6'-1 the UE may proceed to PDSCH reception (act 2C-6'-3), and thereafter end the random access procedure (act 2C-6-4). Similar to the case with no PDSCH, the terminal may continue monitoring PDCCH to find a DCI that can be decoded with X-RNTI or RA-RNTI.

The wireless terminal 26C may monitor the PDCCH with the RA-RNTI and/or the PDCCH with the X-RNTI based on the aforementioned parameter (i.e., ra-ResponseWindowSize) configured by RRC. Also, the wireless terminal 26C may monitor the PDCCH with the X-RNTI based on a parameter (e.g., ra-ResponseWindowSize1). The wireless terminal 26C may monitor the PDCCH with the X-RNTI, in a RA Response window which has a length determined based on the parameter (e.g., ra-ResponseWindowSize1). The parameter (e.g., ra-ResponseWindowSize1) may be configured by the eNB via MIB and/or SIB. Moreover, a-ResponseWindowSize1 may be configured as a parameter separate from ra-ResponseWindowSize, or configured as the same parameter as ra-ResponseWindowSize.

FIG. 3C shows example acts or steps specifically performed by wireless terminal 26A. The acts of FIG. 3C may be performed by terminal random access procedure controller 56, which may comprise the terminal processor 40 executing instructions stored on non-transient memory. Act 3C-1 comprises the wireless terminal 26C receiving configuration parameters broadcasted from the base station, including configuration parameters associating an X-RNTI with preamble information.

Act 3C-2-1 comprises the preamble/resource selection agent 70 selecting a preamble index from one of preamble index first group 72 and preamble index second group 74. As explained above, whether the preamble/resource selection agent 70 selects a preamble index from preamble index first group 72 or preamble index second group 74, and if from preamble index first group 72, the particular preamble index of preamble index first group 72, depends on whether the random access procedure is for a designated request or not. Thus, in some sense act 3C-2 comprises the preamble/resource selection agent 70 selecting a preamble index depending on designated request (e.g., whether there is or is not a designated request, and the particular type of designated request when a designated request is to be made). Act 3C-2-2 comprises generating and transmitting to the base station a preamble sequence, e.g., as message Msg1.

Act 3C-3 comprises receiving and attempting to decode downlink information from the base station, e.g., in/from message Msg2, and using the X-RNTI associated with the transmitted preamble sequence to perform the decoding of the downlink information.

Act 3C-4 comprises the X-RNTI-based RAR checker 62C making a determination how to proceed regarding the random access procedure depending on the decoding using the X-RNTI. If the downlink information can be decoded using the X-RNTI, the in at least some example implementations the random access procedure may be terminated.

FIG. 4C shows example acts or steps specifically performed by radio access node 22B. The acts of FIG. 4C may be performed by node random access procedure controller 54, which may comprise the node processor 30 executing instructions stored on non-transient memory. Act 4C-1 comprises the radio access node 22B broadcasting configuration parameters, e.g., in a system information block (SIB), which may include an association of X-RNTI and preamble information. Act 4C-2 comprises the radio access node 22B receiving a preamble sequence corresponding to the selected preamble index (e.g., in message Msg1 from wireless terminal 26B). Act 4C-3 comprises the random access response generator 60 generating, and the radio access node 22B transmitting, downlink information encoded with the X-RNTI that is associated with the received preamble sequence as an indication of successful reception by the base station of the preamble sequence.

Having provided an overview of the fourth example embodiment and mode, a more detailed discussion follows and is structured according to the aforementioned example phases of the random access procedure.

4-1 Initialization

The Random Access procedure may be initiated by a Physical Downlink Control Channel (PDCCH) order, by the MAC sublayer itself or by the RRC sublayer. Random Access procedure on a Secondary Cell (SCell) may only be initiated by a PDCCH order. If a MAC entity receives a PDCCH transmission consistent with a PDCCH order masked with its C-RNTI, and for a specific Serving Cell, the MAC entity may initiate a Random Access procedure on this Serving Cell. For Random Access on the Special Cell (SpCell, a serving cell supporting PUCCH transmission and contention based Random Access) a PDCCH order or RRC may optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE and is configured with a non-anchor carrier, perform the Random Access procedure on the anchor carrier. Before the procedure can be initiated, the following information for related Serving Cell is assumed to be available for UEs other than NB-IoT UEs, BL UEs or UEs in enhanced coverage, unless explicitly stated otherwise:

- the available set of PRACH resources for the transmission of the Random Access Preamble, prach-ConfigIndex.
- the groups of Random Access Preambles and the set of available Random Access Preambles in each group (SpCell only):
- The preambles that are contained in Random Access Preambles group A and Random Access Preambles group B are calculated from the parameters numberOfRA-Preambles and sizeOfRA-PreamblesGroupA:
- If sizeOfRA-PreamblesGroupA is equal to numberOfRA-Preambles, then there is no Random Access Preambles group B. The preambles in Random Access Preamble group A are the preambles 0 to sizeOfRA-PreamblesGroupA-1 and, if it exists, the preambles in Random Access Preamble group B are the preambles sizeOfRA-PreamblesGroupA to numberOfRA-Preambles-1 from the set of 64 preambles.
- if Random Access Preambles group B exists, the thresholds, messagePowerOffsetGroupB and messageSizeGroupA, the configured UE transmitted power of the Serving Cell performing the Random Access Procedure, $P_{CMAX, c}$, and the offset between the preamble and Msg3, deltaPreambleMsg3, that are required for selecting one of
- the two groups of Random Access Preambles (SpCell only).
- the set of reserved Random Access Preambles.
- the X-RNTI value for each of reserved Random Access Preamble.
- the RA response window size ra-ResponseWindowSize.
- the power-ramping factor powerRampingStep.
- the maximum number of preamble transmission preambleTransMax.
- the initial preamble power preambleInitialReceivedTargetPower.
- the preamble format based offset DELTA_PREAMBLE.
- the maximum number of Msg3 HARQ transmissions maxHARQ-Msg3Tx (SpCell only).
- the Contention Resolution Timer mac-ContentionResolutionTimer (SpCell only).

NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage:

- if the UE is a BL UE or a UE in enhanced coverage:
  - the available set of PRACH resources associated with each enhanced coverage level supported in the Serving Cell for the transmission of the Random Access Preamble, prach-ConfigIndex.
  - the groups of Random Access Preambles and the set of available Random Access Preambles in each group (SpCell only):
    - The preambles that are contained in Random Access Preamble groups for each enhanced coverage level, if it exists, are the preambles firstPreamble to lastPreamble.
    - If sizeOfRA-PreamblesGroupA is not equal to numberOfRA-Preambles, Random Access Preambles group B exists for all enhanced coverage levels and is calculated as above.

NOTE: If Random Access Preamble group B exists, the eNB should ensure that at least one Random Access Preamble is contained in Random Access Preamble group A and Random Access Preamble group B for all enhanced coverage level.

- if the UE is a NB-IoT UE:
  - the available set of PRACH resources supported in the Serving Cell, nprach-ParametersList.
  - for random access resource selection and preamble transmission:
    - a PRACH resource is mapped into an enhanced coverage level.
    - each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers as configured by higher layers. Each group is referred to as a Random Access Preamble group below in the procedure text.
    - a subcarrier is identified by the subcarrier index in the range: [nprach-SubcarrierOffset, nprach-SubcarrierOffset+nprach-NumSubcarriers−1]
    - each subcarrier of a Random Access Preamble group corresponds to a Random Access Preamble.
  - when the subcarrier index is explicitly sent from the eNB as part of a PDCCH order ra-PreambleIndex shall be set to the signaled subcarrier index.
- the mapping of the PRACH resources into enhanced coverage levels is determined according to the following:
  - the number of enhanced coverage levels is equal to one plus the number of RSRP thresholds present in rsrp-ThresholdsPrachInfoList.
  - each enhanced coverage level has one PRACH resource present in nprach-ParametersList.
  - enhanced coverage levels are numbered from 0 and the mapping of PRACH resources to enhanced coverage levels are done in increasing numRepetitionsPerPreambleAttemptorder.
- the criteria to select PRACH resources based on RSRP measurement per enhanced coverage level supported in the Serving Cell rsrp-ThresholdsPrachInfoList.
- the maximum number of preamble transmission attempts per enhanced coverage level supported in the Serving Cell maxNumPreambleAttemptCE.
- the number of repetitions required for preamble transmission per attempt for each enhanced coverage level supported in the Serving Cell numRepetitionPerPreambleAttempt.
- the configured UE transmitted power of the Serving Cell performing the Random Access Procedure, $P_{CMAX, c}$.
- the RA response window size ra-ResponseWindowSize and the Contention Resolution Timer mac-ContentionResolutionTimer (SpCell only) per enhanced coverage level supported in the Serving Cell.
- the power-ramping factor powerRampingStep.
- the maximum number of preamble transmission preambleTransMax-CE.

the initial preamble power preambleInitialReceivedTargetPower.
the preamble format based offset DELTA_PREAMBLE. For NB-IoT the DELTA_PREAMBLE is set to 0.
The Random Access procedure may be performed as follows:
Flush the Msg3 buffer;
set the PREAMBLE_TRANSMISSION_COUNTER to 1;
if the UE is an NB-IoT UE, a BL UE or a UE in enhanced coverage:
  set the PREAMBLE_TRANSMISSION_COUNTER_CE to 1;
  if the starting enhanced coverage level, or for NB-IoT the starting number of NPRACH repetitions, has been indicated in the PDCCH order which initiated the Random Access procedure, or if the starting enhanced coverage level has been provided by upper layers:
    the MAC entity considers itself to be in that enhanced coverage level regardless of the measured RSRP;
  else:
    if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
      the MAC entity considers to be in enhanced coverage level 3;
    else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
      the MAC entity considers to be in enhanced coverage level 2;
    else if the measured RSRP is less than the RSRP threshold of enhanced coverage level 1 as configured by upper layers in rsrp-ThresholdsPrachInfoList then:
      the MAC entity considers to be in enhanced coverage level 1;
    else:
      the MAC entity considers to be in enhanced coverage level 0;
set the backoff parameter value to 0 ms;
for the RN, suspend any RN subframe configuration;
proceed to the selection of the Random Access Resource.
NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

4-2 Preamble Resource Selection
See 2-2.
4-3 Random Access Preamble Transmission
See 1-3.
4-4 Random Access Response Reception
If one of the reserved Random Access Preamble is transmitted, the MAC entity of the UE may monitor the PDCCH of the SpCell for Random Access Response(s) identified by the X-RNTI associated with the transmitted Random Access Preamble, in the RA Response window which starts at the subframe that contains the end of the preamble transmission plus three subframes and has length ra-ResponseWindowSize (or ra-ResponseWindowSize1) configured by RRC. Otherwise, once the Random Access Preamble is transmitted, the MAC entity of the UE may monitor the PDCCH of the SpCell for Random Access Response(s) identified by the RA-RNTI defined below, in the RA Response window which starts at the subframe that contains the end of the preamble transmission plus three subframes and has length ra-ResponseWindowSize configured by RRC. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level.

The RA-RNTI associated with the PRACH in which the Random Access Preamble is transmitted, is computed as:

$$RA\text{-}RNTI = 1 + t\_id + 10 * f\_id$$

where t_id is the index of the first subframe of the specified PRACH ($0 \le t\_id < 10$), and f_id is the index of the specified PRACH within that subframe, in ascending order of frequency domain ($0 \le f\_id < 6$) except for NB-IoT UEs, BL UEs or UEs in enhanced coverage. If the PRACH resource is on a TDD carrier, the f_id is set to fRA, where fRA is a frequency resource index within the considered time instance.

For BL UEs and UEs in enhanced coverage, RA-RNTI associated with the PRACH in which the Random Access Preamble is transmitted, is computed as:

$$RA\text{-}RNTI = 1 + t\_id + 10 * f\_id + 60 * (SFN\_id \bmod (W\max/10))$$

where t_id is the index of the first subframe of the specified PRACH ($0 \le t\_id < 10$), f_id is the index of the specified PRACH within that subframe, in ascending order of frequency domain ($0 \le f\_id < 6$), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to fRA.

For NB-IoT UEs, the RA-RNTI associated with the PRACH in which the Random Access Preamble is transmitted, is computed as:

$$RA\text{-}RNTI = 1 + \text{floor}(SFN\_id/4)$$

where SFN_id is the index of the first radio frame of the specified PRACH.

PDCCH carries DCI (Downlink Control Information), which includes resource assignments for a UE or group of UE's. The base station can transmit many DCI's or PDCCH's in a subframe. When responding to a Random Access Preamble, the base station may generate a DCI with Format 1A or 1C as shown in List 1 and List 2.

List 1 Format 1A
  Flag for format0/format1A differentiation or flag for format0A/format1A differentiation
  Localized/Distributed VRB assignment flag
  Resource block assignment
  Modulation and coding scheme
  HARQ process number—reserved
  New data indicator
  Redundancy version—2 bits
  TPC command for PUCCH
  Downlink Assignment Index—reserved.
  SRS request
  HARQ-ACK resource offset
  SRS timing offset—present only when the DCI format is used for scheduling PDSCH in a LAA Scell and the UE is
  configured with uplink transmission on the LAA Scell.
List 2 Format 1C
  1 bit indicates the gap value
  Resource block assignment
  Modulation and coding scheme The generated DCI may be attached with a Cyclic Redundancy Check (CRC) parity bits for error detection. The CRC parity bits may be further scrambled with a corresponding RNTI. In case of the DCI for Random Access Response, the X-RNTI is used if configured for the transmitted Random Access Preamble, otherwise the RA-RNTI may be used for scrambling the CRC.

The UE that monitors PDCCH may perform blind decoding of the PDCCH payload as it is not aware of the detailed control channel structure. Specifically, the UE under the process of Random Access Response reception may monitor a set of PDCCH candidates (a set of consecutive Control Channel Elements (CCEs) on which a PDCCH could be mapped). In this process the UE uses the aforementioned X-RNTI or RA-RNTI for decoding the candidates.

If the UE has initiated Random Access Preamble transmission with one of the reserved preambles and successfully decodes a DCI with format 1A or 1C with the X-RNTI, the UE may consider that the Random Access procedure is successfully completed. Otherwise, after successful decoding of a DCI with the RA-RNTI, the UE may attempts to receive the Physical Downlink Shared Channel (PDSCH) whose resource is specified in the Resource block assignment field of the DCI with either format 1A or 1C. Accordingly, the MAC entity of the UE may proceed with processing the DL-SCH transport block received in the assigned PDSCH resources as a MAC PDU (see 1-6) for Random Access Response. The UE may continue PDCCH decoding-PDSCH reception during the RA Response window.

The MAC entity may stop monitoring for Random Access Response(s) after successful reception of a Random Access Response containing Random Access Preamble identifiers that matches the transmitted Random Access Preamble.
  If a downlink assignment for this TTI has been received on the PDCCH for the RA-RNTI and the received TB is successfully decoded, the MAC entity may regardless of the possible occurrence of a measurement gap or a Sidelink Discovery Gap for Transmission or a Sidelink Discovery Gap for Reception:
    if the Random Access Response contains a Backoff Indicator subheader:
      may set the backoff parameter value as indicated by the BI field of the Backoff Indicator subheader.
      else, may set the backoff parameter value to 0 ms.
    if the Random Access Response contains a Random Access Preamble identifier corresponding to the transmitted Random Access Preamble, the MAC entity may:
      if the Random Access Preamble is selected by upper layer:
        consider this Random Access Response reception successful and the Random Access procedure successfully completed.
      else, consider this Random Access Response reception successful and apply the following actions for the serving cell where the Random Access Preamble was transmitted:
        may process the received Timing Advance Command (see subclause 5.2);
        may indicate the preambleInitialReceivedTargetPower and the amount of power ramping applied to the latest preamble transmission to lower layers (i.e., (PREAMBLE_TRANSMISSION_ COUNTER−1)*powerRampingStep);
        if the SCell is configured with ul-Configuration-r14, may ignore the received UL grant otherwise may process the received UL grant value and indicate it to the lower layers;
      if, except for NB-IoT, ra-PreambleIndex was explicitly signaled and it was not 000000 (i.e., not selected by MAC):
        may consider the Random Access procedure successfully completed.
      else, if, except for NB-IoT, the Random Access Preamble was selected by the MAC entity, or for NB-IoT:
        may set the Temporary C-RNTI to the value received in the Random Access Response message no later than at the time of the first transmission corresponding to the UL grant provided in the Random Access Response message;
        if this is the first successfully received Random Access Response within this Random Access procedure:
          if the transmission is not being made for the CCCH logical channel, may indicate to the Multiplexing and assembly entity to include a C-RNTI MAC control element in the subsequent uplink transmission;
          may obtain the MAC PDU to transmit from the "Multiplexing and assembly" entity and store it in the Msg3 buffer.
    NOTE: When an uplink transmission is required, e.g., for contention resolution, the eNB may not provide a grant smaller than 56 bits (or 88 bits for NB-IoT) in the Random Access Response.
    NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception may be considered not successful and the MAC entity may:

if the notification of power ramping suspension has not been received from lower layers:
  increment PREAMBLE_TRANSMISSION_COUNTER by 1;
  if the UE is an NB-IoT UE, a BL UE or a UE in enhanced coverage:
    if PREAMBLE_TRANSMISSION_COUNTER= preambleTransMax-CE+1:
      if the Random Access Preamble is transmitted on the SpCell:
        indicate a Random Access problem to upper layers;
        if NB-IoT:
          consider the Random Access procedure unsuccessfully completed;
  else:
    if PREAMBLE_TRANSMISSION_COUNTER= preambleTransMax+1:
      if the Random Access Preamble is transmitted on the SpCell:
        indicate a Random Access problem to upper layers;
      if the Random Access Preamble is transmitted on an SCell:
        consider the Random Access procedure unsuccessfully completed.
if in this Random Access procedure, the Random Access Preamble was selected by MAC:
  based on the backoff parameter, may select a random backoff time according to a uniform distribution between 0 and the Backoff Parameter Value;
  delay the subsequent Random Access transmission by the backoff time;
else if the SCell where the Random Access Preamble was transmitted is configured with ul-Configuration-r14:
  delay the subsequent Random Access transmission until the Random Access Procedure is initiated by a PDCCH order with the same ra-PreambleIndex and ra-PRACH-MaskIndex;
if the UE is an NB-IoT UE, a BL UE or a UE in enhanced coverage:
  increment PREAMBLE_TRANSMISSION_COUNTER_CE by 1;
  if PREAMBLE_TRANSMISSION_COUNTER_CE= maxNumPreambleAttemptCE for the corresponding enhanced coverage level+1:
    reset PREAMBLE_TRANSMISSION_COUNTER_CE;
    consider to be in the next enhanced coverage level, if it is supported by the Serving Cell and the UE, otherwise stay in the current enhanced coverage level;
  select the Random Access Preambles group, ra-ResponseWindowSize, mac-ContennonResolunonTimer, and PRACH resource corresponding to the selected enhanced coverage level. A NB-IoT UE supporting multi-tone Msg3 may only select the single-tone Msg3 Random Access Preambles group if there is no multi-tone Msg3 Random Access Preambles group;
  if the UE is an NB-IoT UE:
    if the Random Access Procedure was initiated by a PDCCH order:
      consider the PRACH resource corresponding to the selected enhanced coverage level as explicitly signaled;
  proceed to the selection of a Random Access Resource.

4-5 Contention Resolution
See 1-5.

5. FIFTH EXAMPLE EMBODIMENT

The fifth example embodiment and mode contains modifications from the fourth embodiment. Specifically, instead of directly configuring the value of X-RNTI associated with a Random Access Preamble, the radio access node may associate the preamble information with a parameter that can be input into a function to derive the X-RNTI. An example of such function, which uses the input parameter idx, is shown below as Function 1:

$$X\text{-}RNTI = 1 + t\_id + 10 * f\_id + f_{offset}(idX) \qquad \text{Function 1}$$

where $$X\text{-}RNTI = 1 + t\_id + 10 * f\_id + f_{offset}(idx), \text{ and}$$

Figure 11:
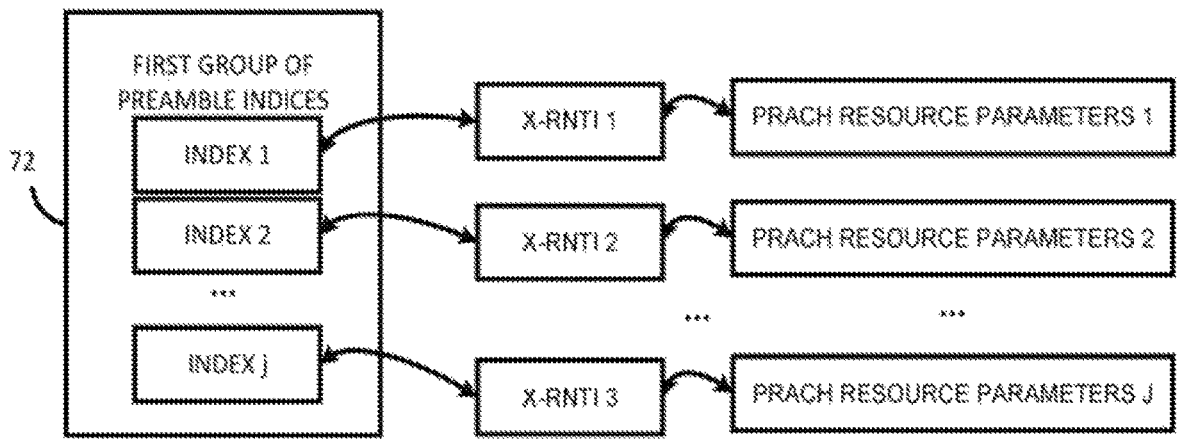
FIG. 11 is a diagrammatic view which illustrating example associations between preamble information and an input function for an X-RNTI function for a fifth example embodiment and mode.

$f_{offset}(x)$ is a function to generate an offset value (e.g. $f_{offset}(idx) = ([\text{pre-determined constant}] * x)$)
t_id is the index of the first subframe of the PRACH resource in the time domain
f_id is the index of the PRACH resource in the frequency domain FIG. 11 shows that there may be an association between preamble information (e.g., a preamble sequence or a preamble index) and an X-RNTI, as well as with an X-RNTI-function input parameter (e.g., idx). Herein, "function input parameter" and "PRACH resource parameter" may be used interchangeably.

Figure 1D:
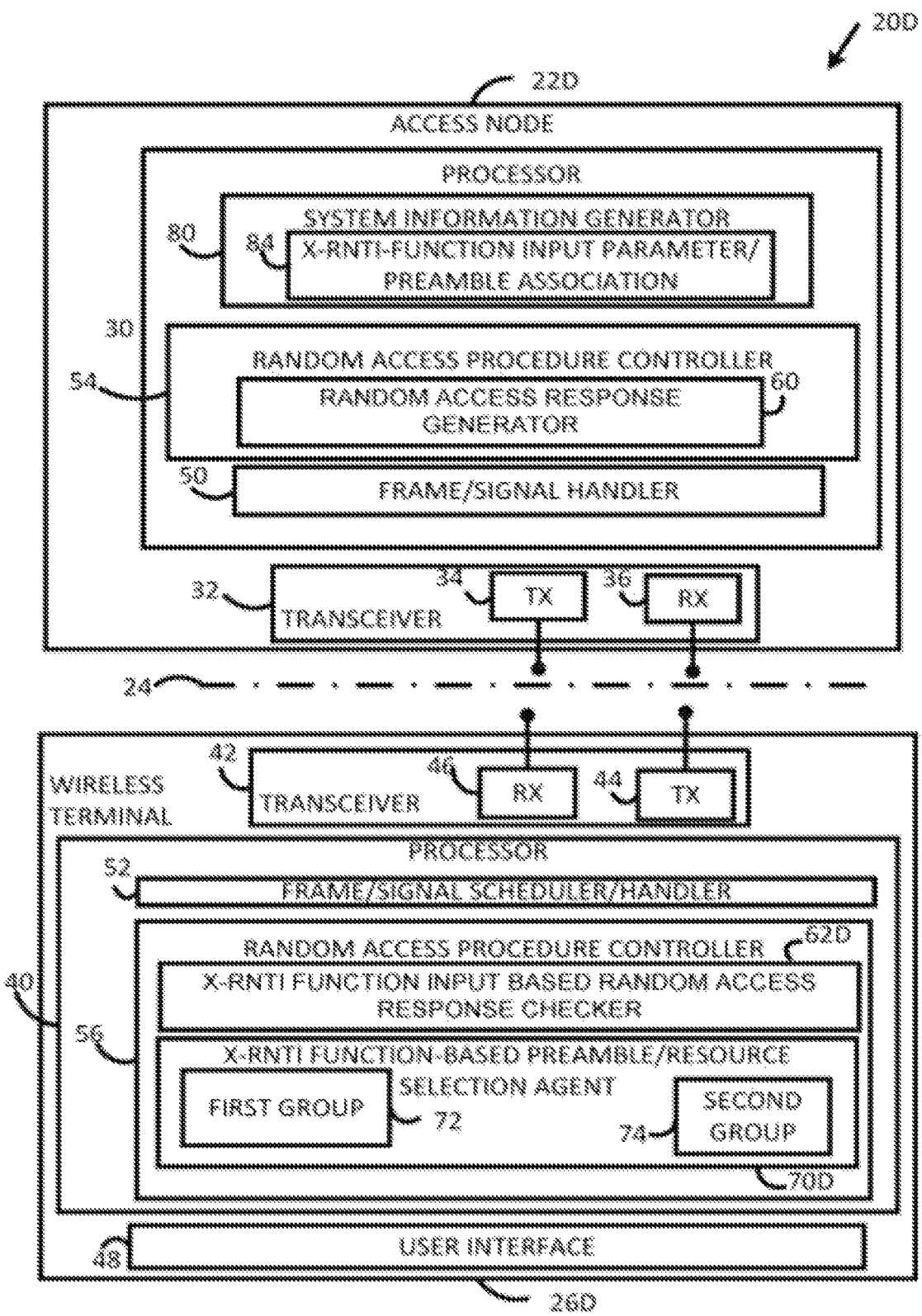
Figure 2D:
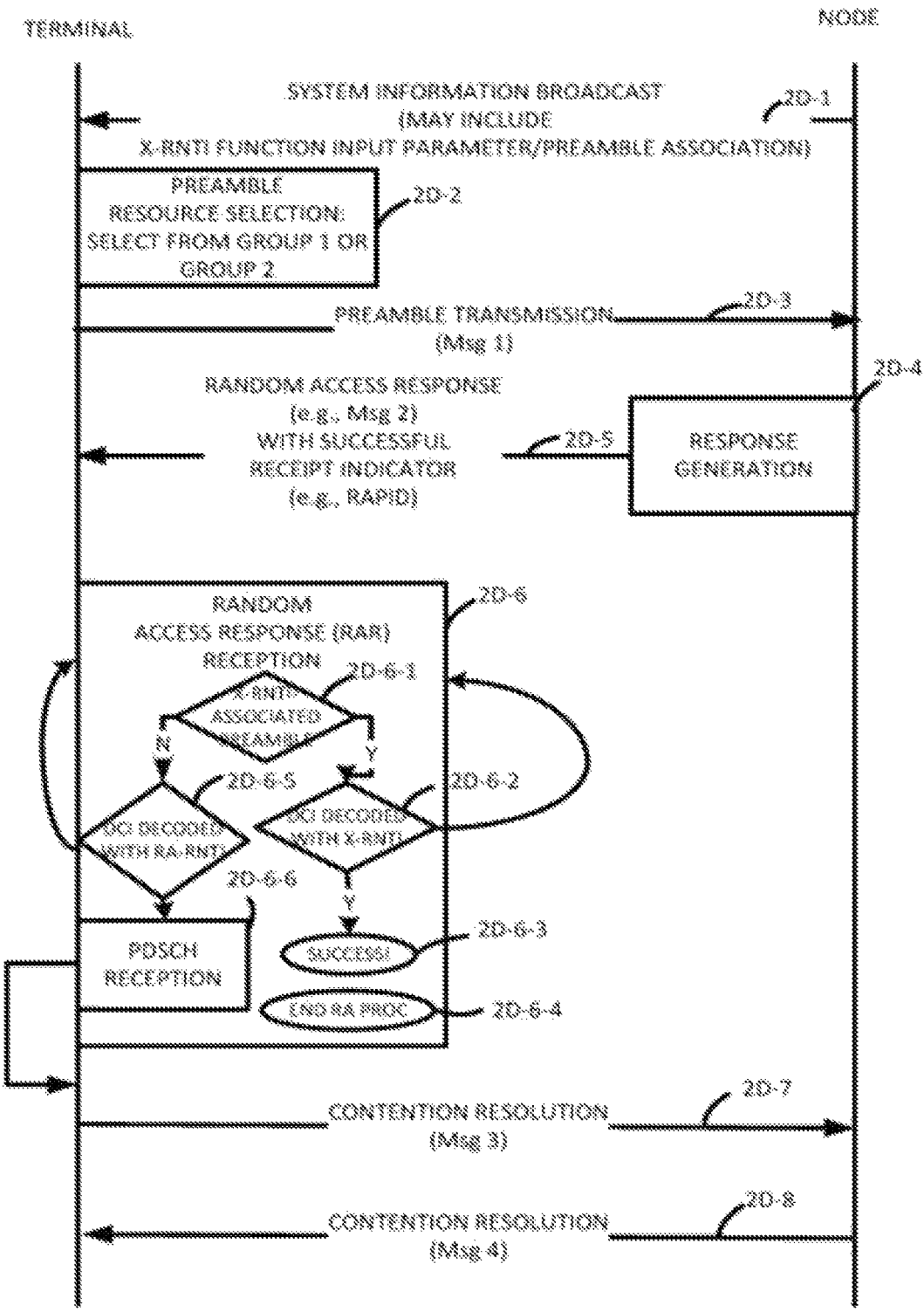

The fifth example embodiment and mode of a random access procedure of the technology disclosed herein is illustrated in FIG. 1D and FIG. 2D. FIG. 1D shows structure and functionalities of radio access node 22D and wireless terminal 26D; FIG. 2D shows acts involved in the random access procedure of the second embodiment including messages.

As shown in FIG. 1D, node processor 30 of radio access node 22D comprises system information generator 80 which works in conjunction with X-RNTI-function input parameter/preamble association functionality 82D. The terminal random access procedure controller 56 of wireless terminal 26D comprises X-RNTI function input-based RAR checker 62D and X-RNTI function-based selection agent 70D.

FIG. 2D shows basic example acts involved in the random access procedure of the fifth embodiment including messages. Act 2D-1 represents the initialization phase and as such depicts the radio access node 22D transmitting, and wireless terminal 26A receiving, configuration parameters. The configuration parameters may be broadcast as system information from the serving cell (e.g., the cell based at radio access node 22D and serving wireless terminal 26D). The configuration parameters may include an association of X-RNTI input function parameter(s) and preamble information, rather than an association of X-RNTI and preamble information as was the case in FIG. 2C. An example implementation of system information (e.g., a SIB) that includes the association of X-RNTI input function parameter(s) and preamble information may be understood with reference to the example RRC information element described below:

-- ASN1START
OnDemandSibGroupList ::= SEQUENCE (SIZE (1..maxSIB-1)) OF OnDemandSibGroup

```
OnDemandSibGroup ::= SEQUENCE {
    sib-TypeList    SIB-TypeList,
    ra-PreambleIndexSibGroup INTEGER (0..63)
    idx INTEGER (0..63)
SIB-TypeList ::= SEQUENCE (SIZE (1..maxSIB-1)) OF SIB-Type
SIB-Type ::= ENUMERATED {
    sibType3, sibType4, sibType5, sibType6,
    sibType7, sibType8, sibType9, sibType10,
    sibType11, sibType12-v920, sibType13-v920,
    sibType14-v1130, sibType15-v1130,
    sibType16-v1130, sibType17-v1250, sibType18-v1250,
    ..., sibType19-v1250, sibType20-v1310, sibType21-v14x0}
}
-- ASN1STOP
```

OnDemandSibGroupList Field Descriptions
  sib-TypeList
  List of SIB types included in this SIB Group.
  ra-PreambleIndexSib Group
  Index of the Random Access Preamble reserved for requesting
  the transmission of the SIBs in the SIB Group.
  Idx
  This field is used for derivation of X-RNTI associated with
  ra-PreambleIndexSibGroup.

Act 2D-2 represents the preamble resource selection phase wherein the wireless terminal 26C selects a random access preamble sequence from a set of sequences available in the serving cell. In the fifth example embodiment and mode, like the second and third example embodiments and modes, in the preamble resource selection phase the X-RNTI function-based selection agent 70D has the choice of selecting a preamble index from the preamble index first group 72 or the preamble index second group 74. If this particular instance of the random access procedure is for a designated request, such as (for example) an on-demand request for system information, the X-RNTI function-based selection agent 70D selects an appropriate preamble index for the designated requested from preamble index first group 72. Otherwise, if not for a designated request, the X-RNTI function-based selection agent 70D selects the preamble index from preamble index second group 74.

Act 2D-3 represents the preamble transmission phase in which the wireless terminal 26C transmits the selected preamble sequence corresponding to the selected preamble index on a physical channel (PRACH) using radio resources configured by the cell and communicated in act 2D-1. The transmission of act 2D-3 is depicted as the Msg1 of the random access procedure.

Act 2D-4 represents the radio access node 22D processing and generating a response to the preamble transmission message (Msg1) of act 2D-3. In processing the preamble transmission message (Msg1) of act 2D-3, the node random access procedure controller 54 takes note of the preamble sequence included in message Msg1. Further, as act 2D-5 the node random access procedure controller 54 causes the random access response generator 60 to generate downlink information which comprises or permits access to a Random Access Response (RAR) message, Msg2, which includes in downlink information an indication of successful receipt of the preamble sequence, the concept of "indication" having been previously explained. At least a portion of the downlink information which is generated as act 2D-4 may be encoded by system information generator 80 using the X-RNTI which, based on X-RNTI-function input parameter/preamble association functionality 82D, the radio access node 22D knows is associated with the received preamble sequence. For example, the downlink information may be cyclically redundancy check (CRC) scrambled with the X-RNTI. The node knows the X-RNTI in the same way as the terminal derived. The received preamble sequence tells the preamble index, and the PRACH resource (time/freq domain) where the preamble transmission was detected tells t_id and f_id.

After transmitting one of the reserved Random Access Preambles, the wireless terminal 26D may monitor the downlink information received from the radio access node 22D. The terminal random access response act 2D-6 is essentially the same as act 2C-6, with the terminal random access procedure controller 56 trying to decode the received downlink information using the X-RNTI that is associated with the preamble sequence that was transmitted in the preamble transmission message Msg1 in the case that the designated request was sent, or tries to decode the received downlink information using RA-RNTI in other cases.

The technology disclosed herein encompasses variations of the foregoing, such as, for example, other alternative methods which may include, not limited to, use of ra-PreamblandexSibGroup as an input of the function $f_{offset}(x)$. Also, $f_{offset}(x)$ may be configured by using a parameter included in MIB and/or SIB.

6. SIXTH EXAMPLE EMBODIMENT

The sixth example embodiment and mode allows use of a different format for the DCI addressed by the X-RNTI. This format (format X hereafter) may contain a pre-determined number of reserved bits, where a pre-determined number of values may be set. As such, the DCI with format X may be considered a designated request unique format DCI. The DCI with format X may be attached with a CRC as previously described. If the UE has initiated Random Access Preamble transmission with one of the reserved preambles and successfully decodes a DCI with format X with the associated X-RNTI, the UE may consider that the Random Access procedure is successfully completed, without receiving PDSCH.

Figure 1E:
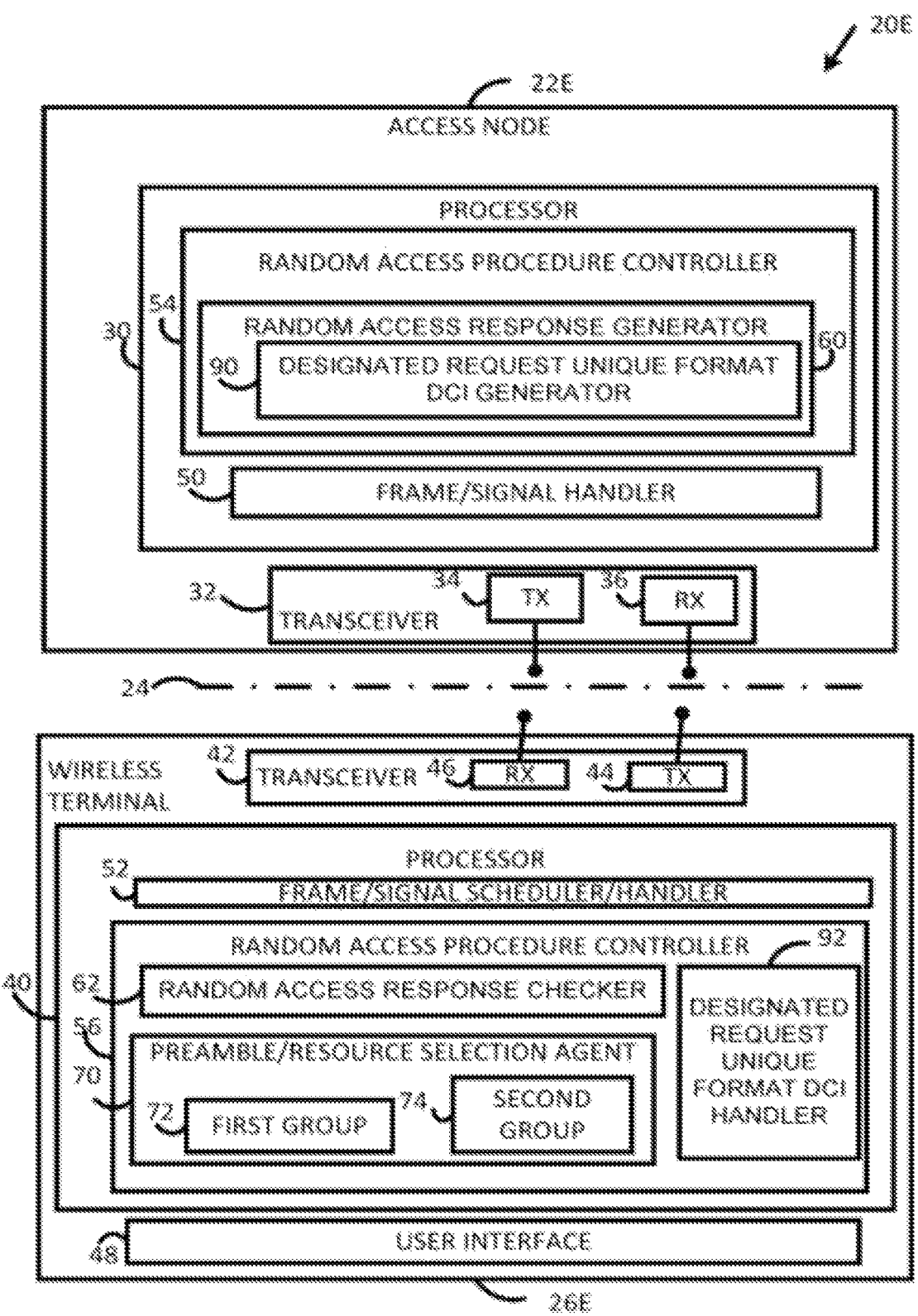
Figure 2E:
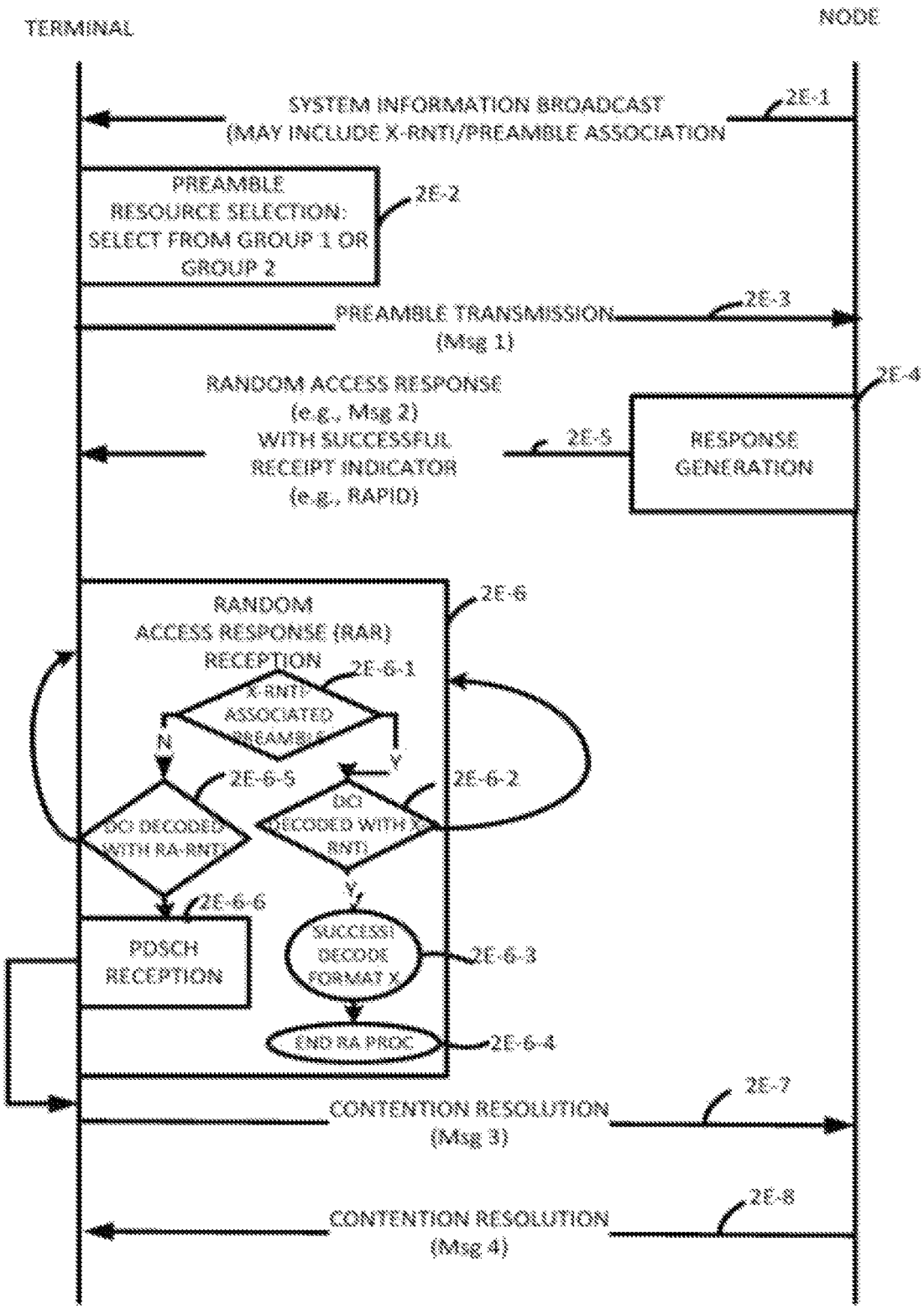

The sixth example embodiment and mode of a random access procedure of the technology disclosed herein is illustrated in FIG. 1E and FIG. 2E. FIG. 1E shows structure and functionalities of radio access node 22E and wireless terminal 26E; FIG. 2E shows acts involved in the random access procedure of the second embodiment including messages. As shown in FIG. 1E, node processor 30 of radio access node 22E comprises random access response generator 60, which in turn comprises designated request unique format DCI generator 90. The terminal random access procedure controller 56 of wireless terminal 26D comprises designated request unique format DCI handler 92.

FIG. 2E shows basic example acts involved in the random access procedure of the fifth embodiment including messages. Act 2E-1 represents the initialization phase and as such depicts the radio access node 22D transmitting, and wireless terminal 26A receiving, configuration parameters. The configuration parameters may be broadcast as system information from the serving cell (e.g., the cell based at radio access node 22E and serving wireless terminal 26E).

Act 2E-2 represents the preamble resource selection phase wherein the wireless terminal 26C selects a random access preamble sequence from a set of sequences available in the serving cell. In the sixth example embodiment and mode, like the second and third example embodiments and modes, in the preamble resource selection phase the preamble/ resource selection agent 70 has the choice of selecting a preamble index from the preamble index first group 72 or the preamble index second group 74. If this particular instance of the random access procedure is for a designated request, such as (for example) an on-demand request for system information, the preamble/resource selection agent 70 selects an appropriate preamble index for the designated requested from preamble index first group 72. Otherwise, if not for a designated request, the preamble/resource selection agent 70 selects the preamble index from preamble index second group 74.

Act 2E-3 represents the preamble transmission phase in which the wireless terminal 26E transmits the selected preamble sequence corresponding to the selected preamble index on a physical channel (PRACH) using radio resources configured by the cell and communicated in act 2E-1. The transmission of act 2E-3 is depicted as the Msg1 of the random access procedure.

Act 2E-4 represents the radio access node 22E processing and generating a response to the preamble transmission message (Msg1) of act 2E-3. In processing the preamble transmission message (Msg1) of act 2E-3, the node random access procedure controller 54 takes note of the preamble sequence included in message Msg1. Further, as act 2E-5 the node random access procedure controller 54 causes the node random access response generator 60 to generate downlink information which comprises or permits access to a Random Access Response (RAR) message, Msg2, which includes in downlink information an indication of successful receipt of the preamble sequence, the concept of "indication" having been previously explained. But if the received preamble sequence corresponds to a designated request, the node random access procedure controller 54 invokes designated request unique format DCI generator 90 to generate a DCI of format X. As stated above, the format X DCI may comprise a pre-determined number of reserved bits, where a pre-determined number of values may be set.

After transmitting one of the reserved Random Access Preambles, the wireless terminal 26E may monitor the downlink information received from the radio access node 22E. The terminal random access response act 2E-6 is essentially the same as act 2C-6, with the terminal random access procedure controller 56 trying to decode the received downlink information using the X-RNTI that is associated with the preamble sequence that was transmitted in the preamble transmission message Msg1 in the case that the designated request was sent, or tries to decode the received downlink information using RA-RNTI in other cases. In the event that the DCI is decoded with the X-RNTI as act 2E-6-2, the terminal random access procedure controller 56 knows that the DCI has format X and accordingly is able to (as act 2E-6-3) to deformat or process the contents of the DCI according to the known format X.

Thus, in the sixth example embodiment and mode, the wireless terminal 26E assume as distinct format for decoding a received DCI with the X-RNTI.

For yet other example embodiments and modes, aspects of the first through sixth example embodiments and modes may be used in combination with one another.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

Figure 12:
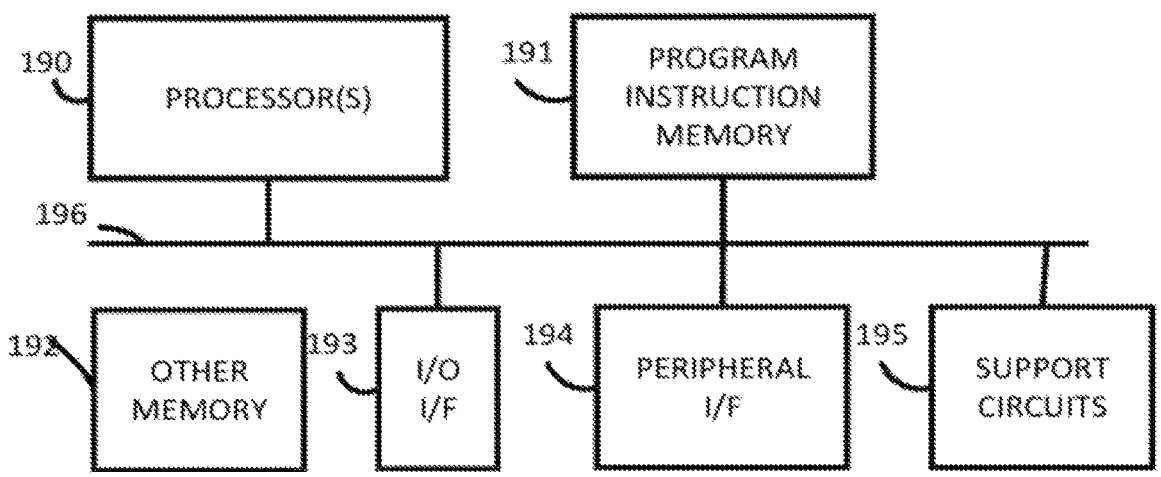
FIG. 12 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 13. FIG. 12 shows an example of such electronic machinery or circuitry, whether node or terminal, as comprising one or more processor(s) circuits 190, program instruction memory 191; other memory 192 (e.g., RAM, cache, etc.); input/output interfaces 193; peripheral interfaces 194; support circuits 195; and busses 196 for communication between the aforementioned units.

The program instruction memory 191 may comprise coded instructions which, when executed by the processor(s), perform acts including but not limited to those described herein. Thus, is understood that each of node processor 30 and terminal processor 40, for example, comprise memory in which non-transient instructions are stored for execution.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

The technology disclosed herein thus encompasses, but is not limited to, the following example embodiments and modes:

1. A mobile station that uses random access procedure for sending a designated request to a radio network, comprising:
 a processor; and
 memory in electronic communication with the processor, wherein instructions stored in the memory are executable to:
 receive configuration parameters periodically broadcasted from a base station;
 select a preamble index from a first preamble group;
 generate and transmit to the base station a preamble sequence associated with the selected preamble index;
 receive and decode downlink data from the base station;
 attempt to find from the downlink data an indication indicating base station's successful reception of the preamble sequence sent by this mobile station;
 consider a successful sending of the designated request if said indication is found.

2. The mobile station of example 1, wherein preamble indices in the first preamble group is reserved for a set of designated requests and distinct from preamble indices in second preamble group, the second preamble group being allocated for other purposes including radio link connection establishment.

3. The mobile station of example 1, wherein each preamble index of in the first preamble group and its association to a designated request are pre-determined.

4. The mobile station of example 1, wherein each preamble index of in the first preamble group and its association to a designated request are configured by the base station.

5. The mobile station of example 1, wherein the mobile station retransmits the preamble sequence if it fails to identify the indication from said downlink data.

6. The mobile station of example 1, wherein the indication is contained in a MAC protocol data unit (PDU) contained in the downlink data, the MAC PDU including one or more preamble indices.

7. The mobile station of example 6, wherein the presence of the preamble index same as the preamble index that the mobile station used for preamble transmission is the indication.

8. The mobile station of example 6, wherein before receiving the MAC PDU the mobile station monitors downlink control signal to obtain resource allocation information for the downlink data that will be used for the MAC PDU transmission.

9. The mobile station of example 8, wherein the MAC PDU consists of a header and a payload, the header further consisting of one or a plurality of subheaders, the payload further consisting of one or a plurality of Random Access Responses (RARs), each of the subheaders containing an index of a received preamble being associated with one of the RARs, said association being in such a way that the RARs are arranged in the order of their associated subheaders.

10. The mobile station of example 9, wherein the mobile station processes a RAR associated with a subheader containing one of the first preamble index group as a different format from the format used in RARs associated with subheaders with preamble indices in the second preamble index group.

11. The mobile station of example 9, wherein the mobile station assumes non-presence of a RAR in the payload when a subheader contains one of the first preamble index group.

12. The mobile station of example 8, wherein the downlink control signal includes one or more downlink control information (DCI), each of which is used for resource assignment of the downlink data and scrambled with a Radio Network Temporary Identifier (RNTI).

13. The mobile station of example 9, wherein the mobile station decodes the DCI with a first pre-determined RNTI.

14. The mobile station of example 1, wherein said indication is contained in a DCI.

15. The mobile station of example 14, wherein the indication is a second RNTI that successfully decodes the DCI, the second RNTI being associated with the preamble index used for preamble sequence transmission.

16. The mobile station of example 15, wherein the mobile station assumes a distinct DCI format for decoding a received DCI with a second RNTI.

17. The mobile station of example 15, wherein the association of the preamble index and the second RNTI is pre-determined.

18. The mobile station of example 15, wherein the association of the preamble index and the second RNTI is configured by the base station.

19. The mobile station of example 1, wherein the designated request is a request for on-demand delivery of system information blocks.

20. The mobile station of example 19, wherein the mobile station receives from the base station configuration parameters including at least one set of a preamble index and associated system information blocks.

21. The mobile station of example 19, wherein the mobile station receives from the base station configuration parameters including at least one set of a preamble index, associated system information blocks and an associated second RNTI to be used for decoding DCIs.

22. A base station that uses random access procedure for receiving a designated request from a mobile station, comprising:
 a processor; and
 a memory in electronic communication with the processor, wherein instructions stored in the memory are executable to:
 periodically broadcast configuration parameters;
 receive a preamble sequence;
 identify the preamble index associated with the preamble sequence;

transmit downlink data containing an indication indicating base station's successful reception of the preamble sequence;

identify and process the designated request associated with the preamble index if the preamble index is one in a first preamble index group.

23. The base station of example 22, wherein preamble indices in the first preamble group is reserved for a set of designated requests and distinct from preamble indices in second preamble group, the second preamble group being allocated for other purposes including radio link connection establishment.

24. The base station of example 22, wherein each preamble index of in the first preamble group and its association to a designated request are pre-determined.

25. The base station of example 22, wherein each preamble index of in the first preamble group and its association to a designated request are configured by the base station.

26. The base station of example 22, wherein the indication is contained in a MAC protocol data unit (PDU) contained in the downlink data, the MAC PDU including one or more preamble indices.

27. The base station of example 26, wherein the base station includes in the MAC PDU preamble indices corresponding to the preamble sequences received from mobile stations.

28. The base station of example 27, wherein the MAC PDU consists of a header and a payload, the header further consisting of one or a plurality of subheaders, the payload further consisting of one or a plurality of Random Access Responses (RARs), each of the subheaders containing an index of a received preamble being associated with one of the RARs, said association being in such a way that the RARs are arranged in the order of their associated subheaders.

29. The base station of example 28, wherein the base station includes in the payload a RAR associated with a subheader containing one of the first preamble index group, the format of the RAR being different from RARs associated with subheaders with preamble indices in the second preamble index group.

30. The base station of example 28, wherein the base station does not include a RAR associated with a subheader containing one of the first preamble index group.

31. The base station of example 26, wherein before sending the MAC PDU the base station transmits downlink control signal that contains resource allocation information for the downlink data that will be used for the MAC PDU transmission.

32. The base station of example 30, wherein the downlink control signal includes one or more downlink control information (DCI), each of which is used for resource assignment of the downlink data and scrambled with a Radio Network Temporary Identifier (RNTI).

33. The base station of example 32, wherein the base station scrambles the DCI for a received preamble sequence associated with a preamble index in the first preamble group with a first pre-determined RNTI.

34. The base station of example 22, wherein said indication is contained in a DCI.

35. The base station of example 34, wherein the indication is a second RNTI that scrambles the DCI for a received preamble sequence associated with a preamble index in the first preamble group, the second RNTI being associated with the preamble index.

36. The base station of example 35, wherein the base station uses a distinct DCI format designated for a DCI to be rambled with a second RNTI.

37. The base station of example 35, wherein the association of the preamble index and the second RNTI is pre-determined.

38. The base station of example 35, wherein the association of the preamble index and the second RNTI is configured by the base station.

39. The base station of example 22, wherein the designated request is a request for on-demand delivery of system information blocks.

40. The base station of example 39, wherein the base station transmits configuration parameters including at least one set of a preamble index and associated system information blocks.

41. The base station of example 39, wherein the base station transmits configuration parameters including at least one set of a preamble index, associated system information blocks and an associated second RNTI to be used for decoding DCIs.

42. A user equipment comprising:
transmitting circuitry configured to transmit a random access preamble configured for a request of system information,
receiving circuitry configured to receive a random access response,
processor circuitry configured to consider a reception of the random access response as successful in a case that the random access response comprises a random access preamble identifier (RAPID) corresponding to the transmitted random access preamble, wherein
the RAPID is in a medium access control (MAC) subheader, and
the processor circuitry is configured to consider a random access procedure as successfully completed in a case that MAC random access response (MAC RAR) corresponding to the MAC subheader is not included in a MAC protocol data unit (MAC PDU).

43. The user equipment of example 42, wherein the MAC RAR comprises at least a timing advance command, an uplink grant, and a temporary Cell Radio Network Temporary Identifier (C-RNTI).

44. The user equipment of example 42, wherein the receiving circuitry is configured to receive information used for configuring at least one random access preamble for the request of the system information.

45. The user equipment of example 42, wherein
the receiving circuitry is configured to receive information used for configuring physical random access channel (PRACH) resources for the request of the system information, and the transmitting circuitry is configured to transmit the random access preamble using the PRACH resources.

46. A base station apparatus comprising:
receiving circuitry configured to receive a random access preamble configured for a request of system information,
processor circuitry configured to generate a random access response that contains a random access preamble identifier (RAPID) corresponding to the received random access preamble, wherein
the RAPID is in a medium access control (MAC) subheader, and
in a case that the RAPID in the MAC subheader corresponds to the random access preamble configured for the request of the system information, MAC random access response (MAC RAR) corresponding to the MAC subheader is not included in a MAC protocol data unit (MAC PDU); and transmitting circuitry configured to transit the random access response.

47. The base station apparatus of example 46, wherein the MAC RAR comprises, at least, a timing advance command, an uplink grant, and a temporary Cell Radio Network Temporary Identifier (C-RNTI).

48. The base station apparatus of example 46, wherein the transmitting circuitry is configured to transmit information used for configuring, at least, one random access preamble for the request of the system information.

49. The base station apparatus of example 46, wherein the transmitting circuitry is configured to transmit information used for configuring physical random access channel (PRACH) resources for the request of the system information, and the receiving circuitry is configured to receive the random access preamble using the PRACH resources.

50. A method in a user equipment comprising:
transmitting a random access preamble configured for a request of system information, and
receiving a random access response, wherein
in a case that the random access response contains a random access preamble identifier (RAPID) corresponding to the transmitted random access preamble, a reception of the random access response is considered as successful,
the RAPID is in a medium access control (MAC) subheader, and
in a case that a MAC random access response (MAC RAR) corresponding to the MAC subheader is not included in a MAC protocol data unit (MAC PDU), a random access procedure is considered as successfully completed.

51. The method of example 50, wherein
the MAC RAR comprises, at least, a timing advance command, an uplink grant, and a temporary Cell Radio Network Temporary Identifier (C-RNTI).

52. The method of example 50, wherein further comprising:
receiving information used for configuring at least one random access preamble for the request of the system information.

53. The method of example 50, wherein further comprising:
receiving information used for configuring physical random access channel (PRACH) resources for the request of the system information, and transmitting the random access preamble using the PRACH resources.

54. A method in a base station apparatus comprising:
receiving a random access preamble configured for a request of system information, and
transmitting a random access response that contains a random access preamble identifier (RAPID) corresponding to the received random access preamble, wherein
the RAPID is in a medium access control (MAC) subheader, and
in a case that the RAPID in the MAC subheader corresponds to the random access preamble configured for the request of the system information, MAC random access response (MAC RAR) corresponding to the MAC subheader is not included in a MAC protocol data unit (MAC PDU).

55. The method of example 54, wherein the MAC RAR comprises, at least, a timing advance command, an uplink grant, and a temporary Cell Radio Network Temporary Identifier (C-RNTI).

56. The method of example 54, wherein further comprising:
transmitting information used for configuring at least one random access preamble for the request of the system information.

57. The method of example 54, wherein further comprising:
transmitting information used for configuring physical random access channel (PRACH) resources for the request of the system information, and
receiving the random access preamble using the PRACH resources.

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment (UE), comprising:
one or more non-transitory computer-readable media having computer-executable instructions embodied thereon; and
at least one processor coupled to the one or more non-transitory computer-readable media, and configured to execute the computer-executable instructions to:
initiate a random access (RA) procedure by a medium access control (MAC) layer of the UE for a system information (SI) request triggered by an upper layer of the UE;
select a specific preamble index corresponding to the SI request from a group of RA preambles, the specific preamble index being associated with a specific Radio Network Temporary Identifier (RNTI) corresponding to the SI request;
transmit, to a base station (BS), an RA preamble based on the specific preamble index using the specific RNTI on a physical random access channel (PRACH) resource during the RA procedure;

receive, from the BS, a downlink assignment on a Physical Downlink Control Channel (PDCCH) for the specific RNTI, the downlink assignment scheduling a Physical Downlink Shared Channel (PDSCH);

receive, from the BS, a Random Access Response (RAR) on the PDSCH, the RAR including a MAC protocol data unit (PDU) during the RA procedure, the MAC PDU including a first MAC subheader;

consider the RAR reception successful in a case that the first MAC subheader includes a random access preamble identifier (RAPID) corresponding to the RA preamble;

indicate, by the MAC layer of the UE, successful reception of the RAR for the SI request to the upper layer of the UE after the RAR reception is considered successful; and consider the RA procedure successfully completed in a case that the MAC PDU includes no MAC RAR corresponding to the first MAC subheader.

2. The UE of claim 1, wherein the at least one processor is further configured to execute the computer-executable instructions to indicate, by the MAC layer of the UE, to the upper layer of the UE that the SI request is successful.

3. The UE of claim 1, wherein the RA preamble is configured, by the BS, for the SI request.

4. The UE of claim 1, wherein the PRACH resource is configured, by the BS, for the SI request.

5. The UE of claim 1, wherein the SI request is a request for an on-demand system information block (SIB).

6. The UE of claim 1, wherein the MAC PDU further includes a second MAC subheader that includes a backoff indicator.

7. The UE of claim 1, wherein the MAC PDU further includes a second MAC subheader and a MAC RAR corresponding to the second MAC subheader.

8. The UE of claim 7, wherein the MAC RAR includes at least one of a timing advance command, an uplink (UL) grant, and a temporary Cell Radio Network Temporary Identifier (C-RNTI).

9. A method for performing a system information (SI) request by a user equipment (UE), the method comprising:

initiating a random access (RA) procedure by a medium access control (MAC) layer of the UE for the SI request triggered by an upper layer of the UE;

selecting a specific preamble index corresponding to the SI request from a group of RA preambles, the specific preamble index being associated with a specific Radio Network Temporary Identifier (RNTI) corresponding to the SI request;

transmitting, to a base station (BS), an RA preamble based on the specific preamble index using the specific RNTI on a physical random access channel (PRACH) resource during the RA procedure;

receiving, from the BS, a downlink assignment on a Physical Downlink Control Channel (PDCCH) for the specific RNTI, the downlink assignment scheduling a Physical Downlink Shared Channel (PDSCH);

receiving, from the BS, a Random Access Response (RAR) on the PDSCH, the RAR including a MAC protocol data unit (PDU) during the RA procedure, the MAC PDU including a first MAC subheader;

considering the RAR reception successful in a case that the first MAC subheader includes a random access preamble identifier (RAPID) corresponding to the RA preamble;

indicating, by the MAC layer of the UE, successful reception of the RAR for the SI request to the upper layer of the UE after the RAR reception is considered successful; and considering the RA procedure successfully completed in a case that the MAC PDU includes no MAC RAR corresponding to the first MAC subheader.

10. The method of claim 9, further comprising indicating, by the MAC layer of the UE, to the upper layer of the UE that the SI request is successful.

11. The method of claim 9, wherein the RA preamble is configured, by the BS, for the SI request.

12. The method of claim 9, wherein the PRACH resource is configured, by the BS, for the SI request.

13. The method of claim 9, wherein the SI request is a request for an on-demand system information block (SIB).

14. The method of claim 9, wherein the MAC PDU further includes a second MAC subheader that includes a backoff indicator.

15. The method of claim 9, wherein the MAC PDU further includes a second MAC subheader and a MAC RAR corresponding to the second MAC subheader.

16. The method of claim 15, wherein the MAC RAR includes at least one of a timing advance command, an uplink (UL) grant, and a temporary Cell Radio Network Temporary Identifier (C-RNTI).

* * * * *